United States Patent [19]
Graham

[11] Patent Number: 5,918,053
[45] Date of Patent: *Jun. 29, 1999

[54] METHOD AND SYSTEM FOR DIAGRAMING COLLABORATIONS DEDUCED FROM SMALL TALKCODE USING A DESIGN VIRTUAL MACHINE

[75] Inventor: Stephen Glen Graham, Chapel Hill, N.C.

[73] Assignee: International Business Machines Corp., Armonk, N.Y.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/769,916

[22] Filed: Dec. 19, 1996

[51] Int. Cl.⁶ .................................................. G06F 9/00
[52] U.S. Cl. .................. 395/704; 395/702; 395/183.14; 707/102
[58] Field of Search ................... 395/701, 702, 395/703, 704, 183.13, 183.14, 708; 707/102, 103

[56] References Cited

U.S. PATENT DOCUMENTS

| | | | |
|---|---|---|---|
| 4,864,569 | 9/1989 | DeLucia et al. | 395/183.14 |
| 4,885,717 | 12/1989 | Beck et al. | 395/704 |
| 5,093,914 | 3/1992 | Coplien et al. | 395/704 |
| 5,269,014 | 12/1993 | Ogino | 395/500 |
| 5,295,242 | 3/1994 | Mashruwala et al. | 345/356 |
| 5,408,667 | 4/1995 | Brodie et al. | 395/702 |
| 5,450,586 | 9/1995 | Kuzara et al. | 395/704 |
| 5,592,600 | 1/1997 | De Pauw et al. | 345/440 |
| 5,615,333 | 3/1997 | Juettner et al. | 395/183.14 |

*Primary Examiner*—Thomas R. Peeso
*Assistant Examiner*—Tuan Q. Dam
*Attorney, Agent, or Firm*—A. Bruce Clay

[57] ABSTRACT

A system uses a design virtual machine to interpret execution over one or more methods to deduce collaborations. When collaborations are deduced in this manner, the collaborations can be visualized and displayed using Object Structure Diagrams, Object Interaction Diagrams and CRC Reports.

21 Claims, 29 Drawing Sheets

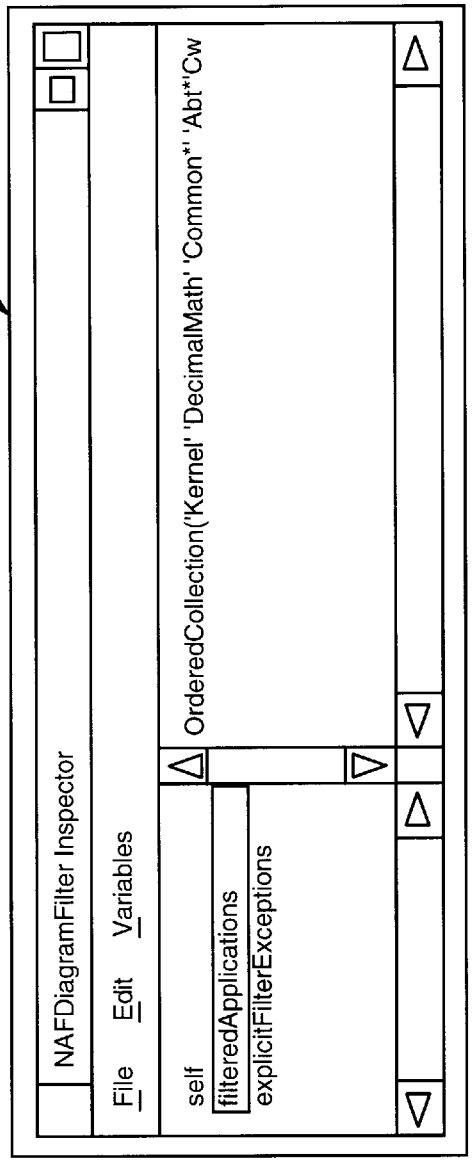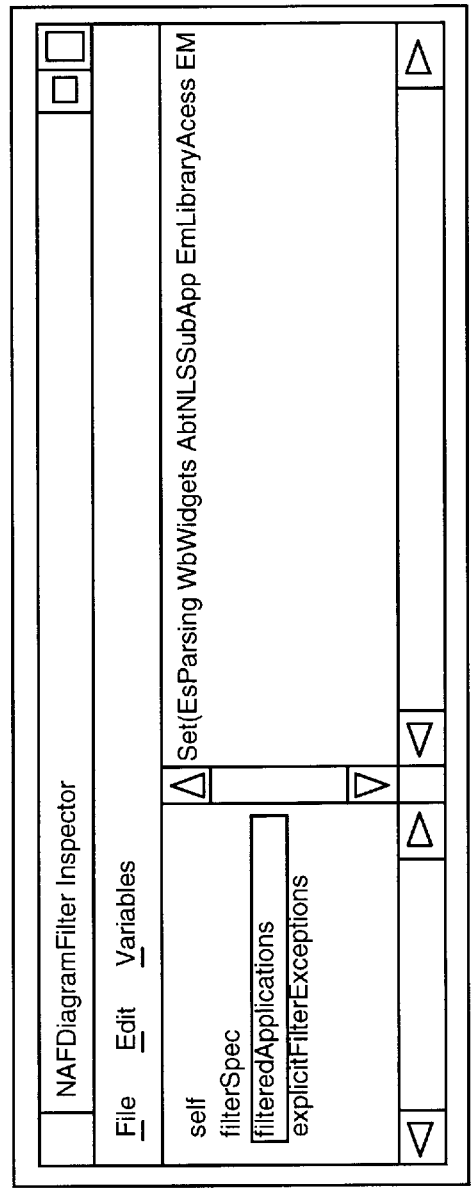
FIG. 23
FIG. 24

FIG. 30A

NAFArtifact
  Class Name
  Superclass
  Appraisal related

540    NAFArtifact>>browseAppraisal

| Parameter | None |
|---|---|
| Returns | self |
| Method Description | Open a browser on the receiver's appraisal. |
| Collaborators | NAFAppraisal>>#browse | |
| Access | Public |
| Must be Overridden | No |

542    NAFArtifact>>browseAppraisaForm: aBrowser

| Parameters | aBrowser: hOf EtAbstractMethodsBrowser |
|---|---|
| Returns | self |
| Method Description | Open a browser on the receiver's appraisal, launch it form the given browser |
| Collaborators | NAFAppraisal>>#browseFrom: | |
| Access | Public |
| Must be Overridden | No |

544    NAFArtifact>>contentAppraisals

| Parameter | None |
|---|---|
| Returns | iOf OrderedCollection {of:hOfNAFAppraisal} |
| Method Description | Answer a collection of appraisals for the receiver's_content artifacts. |
| Collaborators | **UNAVAILABLE |
| Access | Public |
| Must be Overridden | No |

546    NAFArtifact>>defaultAppraisal

| Parameter | None |
|---|---|
| Returns | hOf NAFAppraisal |
| Method Description | Answer the default appraisal for me. |

| Collaborators | False>>#ifTrue: | |
|---|---|---|
| Access | Public | |
| Must be Overridden | No | |

548     NAFArtifact>>defaultAppraisal: anAppraisal

| Parameter | anAppraisal: hOf NAFAppraisal | |
|---|---|---|
| Returns | self | |
| Method Description | Set the default appraisal for me. | |
| Collaborators | | |
| Access | Public | |
| Must be Overridden | No | |

550     NAFArtifact>>defaultAppraiser

| Parameter | none | |
|---|---|---|
| Returns | hOf NAFAppraiser | |
| Method Description | Answer the default appraiser for me. | |
| Collaborators | NAFAppraiser class>>#appraising: | |
| Access | Public | |
| Must be Overridden | No | |

552     NAFArtifact>>defaultAppraiserClass

| Parameters | none | |
|---|---|---|
| Returns | hOf NAFAppraiser | |
| Method Description | Answer the default appraiser class for me. | |
| Collaborators | **UNAVAILABLE | |
| Access | Public | |
| Must be Overridden | No | |

554     NAFArtifact>>initializeDefaultAppraisal

| Parameters | None |
|---|---|
| Returns | self |
| Method Description | Answer the default appraisal for me. |

METHOD AND SYSTEM FOR DIAGRAMING COLLABORATIONS DEDUCED FROM SMALLTALK CODE USING A DESIGN VIRTUAL MACHINE

RELATED INVENTION

IBM application Ser. No. 08/769,910 entitled "Method and System for Synchronizing Code with Design", filed concurrently herewith on Dec. 19, 1996.

FIELD OF THE INVENTION

The present invention relates in general to computer software, and in particular to a method and system for diagraming collaborations deduced from Smalltalk code using a design virtual machine.

BACKGROUND OF THE INVENTION

Software designs, much like abstract analogs (such as maps and blueprints), are built because they are useful for explaining, navigating, and understanding the richer underlying realities. With software, however, it is rare for even the most general design of an implemented system to be either complete or accurate. In many projects, senior programmers brainstorm on a white board, produce the program and produce just enough of a retrospective design to satisfy management. In projects with formal analysis and design stages, the design may be accurate when it is first made, but it seldom matches the final implementation. As code is developed it diverges from the design. These changes are rarely transferred back to the design documents because programmers seldom take the trouble to find and edit the design documents.

The lack of accurate design adds dramatically to the life cycle cost of software systems. Mismatches between design and code slow initial development of large systems because teams working on one portion of the system rely in part upon the design descriptions of other portions of a system. Inaccurate design has an even more dramatic effect on maintenance because maintenance done without understanding the underlying design is time consuming and prone to error.

Design and code can neither be completely separated from each other nor completely joined with one another. They overlap in that both describe the same system but are different because the intended audience of those descriptions are quite different. Design communicates the intent of the designers to other humans, while code communicates design intent to the machine. Humans share a vast common knowledge and can deal with abstractions but are weak at handling masses of detail. The machine is not hampered by details but is oblivious to abstraction and generality.

One prior art approach to synchronizing code and design supposes that if programmers are unable or unwilling to keep the code synchronized with design, perhaps programmers can be dispensed with and simply generate the code from the design. In some cases, such as when an application merely maintains a database, this approach works. However, for general programming this approach fails for several reasons. One of these reasons is that analysts and designers seldom, if ever anticipate all the details encountered in the actual coding. Programmers need to make changes that extend or "violate" the design because they discover relationships or cases not foreseen by the designers. Removing the programmers from the process does not impart previously unavailable omniscience to the designers. Additionally, most real world applications contain behavior that is best described with algorithmic expressions. Programming code constructs have evolved to effectively and efficiently express such algorithms. Calling a detailed description of algorithmic behavior "design" simply because it is expressed in a formalism that isn't recognizable as "code" does not eliminate the complexity of the behavior.

Another previously known method is the automated extraction of object structure from code. Some tools are available that can create more or less detailed object structure diagrams directly from C++ class definitions that contain inheritance and attribute type information. Some Smalltalk systems provide similar attribute "type" information that allows these tools to be similarly effective. Without the attribute information, tools can only extract the inheritance structure. This method does not actually parse and model code other than C++ header files or Smalltalk class definitions. Therefore, this approach can at best identify "has-a" and "is-a" relationships. These relationships may imply collaboration but this approach does not specifically identify any of the transient collaborations that are important for understanding design. In addition, it does not provide any information about algorithms.

Another method is the automated deduction of design by analyzing code execution. Collaborations implicit in Smalltalk code are difficult to deduce statically from the code and may not be fully determined until run time. However, Smalltalk is strongly typed at runtime so it may be determined exactly what kind of objects are participating in all collaborations by examining the receiver and the arguments involved in all message sends. The resulting information can be used to specify the collaborations observed during the execution. This method suffers from the following problems: (1) it requires test cases to exercise the code; each of these test cases must construct an initial state which is sometimes elaborate; (2) the test cases themselves require careful construction and may become obsolete as the system changes; (3) the effort needed to construct and maintain these test cases can be a deterrent to routine use of this technique; and (4) full coverage by the test cases is difficult to obtain and the degree of coverage is difficult to assess. This undermines confidence in the resulting design. Without full coverage, the extracted collaboration design is likely to be incomplete in important ways. For instance, the way a system is designed to handle the exceptional cases can be more telling than the way it handles the common ones.

Larger-grain object oriented design involves just a handful of basic elements:

1) Object structure: diagrammatic specification of which objects are in a model and how they are statically related, these diagrams are referred to as Object Structure Diagrams (OSDs);

2) CRC (Class, Responsibilities, Collaborators): short textual description of object behavior (responsibilities) and a list of other related classes (collaborators); and 3) Object interaction: diagrammatic and textual representation of the timing of interaction between objects in response to a particular event or transaction within a system, these diagrams are referred to as Object Interaction Diagrams (OIDs).

These three design artifacts are different perspectives depicting how objects collaborate within an object oriented system. These diagrams are artifacts of the design process in that they represent the system at a level of abstraction different from code. This design information is intended to communicate certain details of a system and elide other details (such as implementation in code). Design artifacts are produced for communication between human beings, for example, the designer and other development team members, the development team and the customer or etc.

Proper design artifacts, that are kept up to date in light of design defects found and removed throughout the software development life-cycle are expected by-products of a mature development process. Customers demand these artifacts from development teams in order to validate that their requirements are reflected in the system and to provide a higher level of abstraction from the code to help post-development teams understand and properly maintain the software.

The problem is that the design artifacts (if they exist at all) do not usually reflect the current reality as embodied in the working code. Design defects discovered during implementation do not get reflected in updated design artifacts. The design becomes out of date, and to the extent it is out of date, the danger of using the design artifacts to understand the system increases. Because the current practice of software development tends not to update design artifacts, design artifacts are not trusted and tend to be unused.

Thus, there is a need for a method and system which allows for simple and efficient diagraming of collaborations deduced from Smalltalk code using a design virtual machine.

SUMMARY OF THE INVENTION

A system uses a design virtual machine to interpret execution over one or more methods to deduce collaborations. When collaborations are deduced in this manner, the system can visualize this deduction by creating and/or annotating changes in:

Object Structure Diagrams

Object Interaction Diagrams

CRC Reports

In one embodiment of the present invention, a method displays results of design virtual machine execution of at least one method of an object oriented computer program. Execution steps are created for a selected method. As directed by the execution steps, the design is traced through one step at a time. The tracing comprises fetching appropriate design information and checking for design violations. The methods are then automatically displayed.

BRIEF DESCRIPTION OF THE DRAWINGS

For a more complete understanding of the present invention and for further advantages thereof, reference is now made to the following Detailed Description taken in conjunction with the accompanying drawings, in which:

FIGS. 22–27 illustrate the use of a filter with the present invention; and

FIGS. 28–30 illustrate the present invention in use with a CRC Editor.

DETAILED DESCRIPTION OF THE INVENTION

Figure 1:
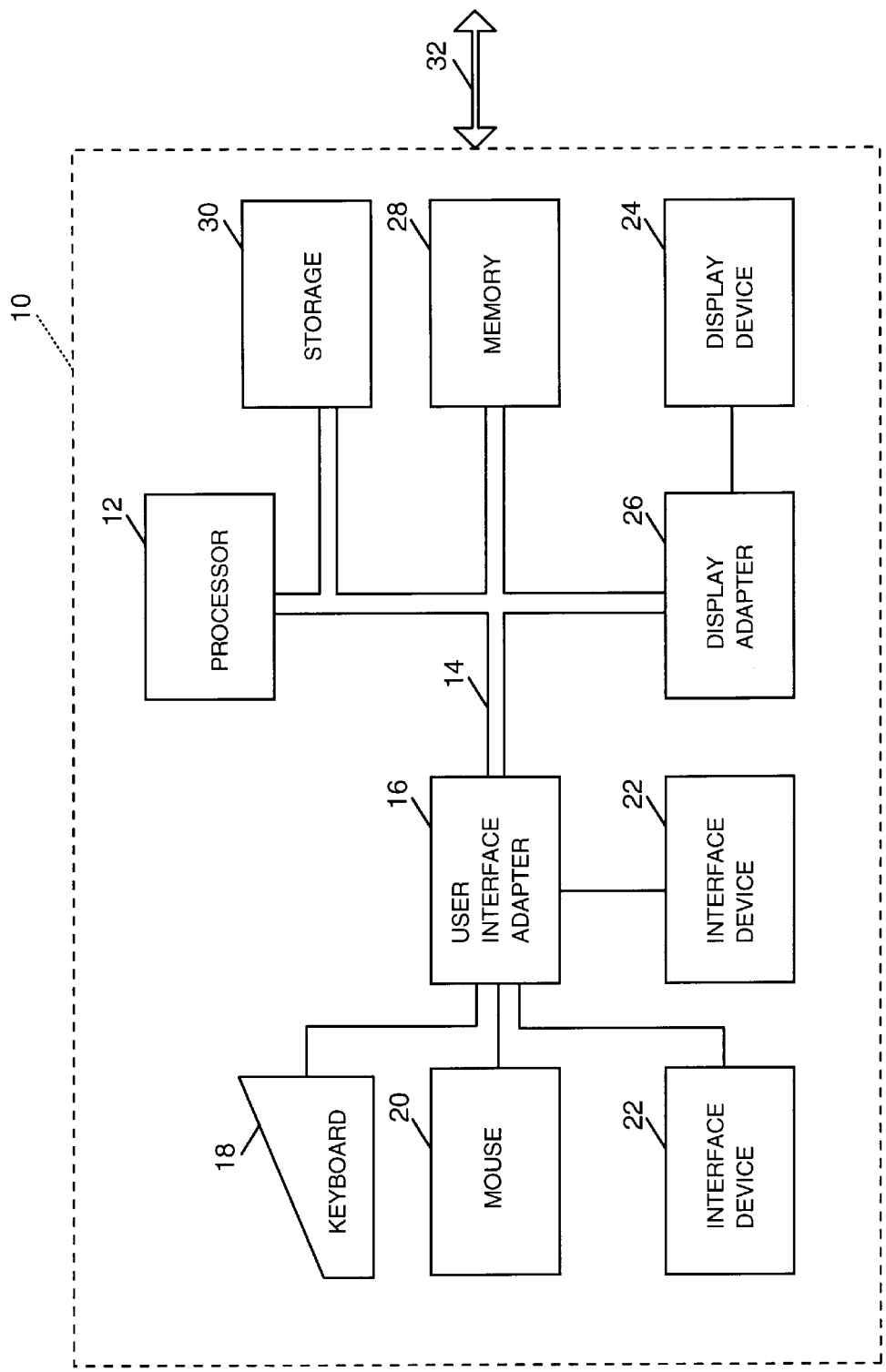
FIG. 1 illustrates a representative hardware environment in which the present invention may be practiced.

The present invention as described may be performed in an object oriented development language such as Smalltalk or JAVA ("JAVA" is a trademark of Sun Microsystems, Inc.). FIG. 1 illustrates a representative hardware environment 10 in which the present invention may be practiced. The environment of FIG. 1 is representative of a conventional single user of a computer workstation, such as a personal computer and related peripheral devices. The environment includes a microprocessor 12 and a bus 14 employed to connect and enable communication between the microprocessor 12 and the components of the workstation in accordance with known techniques. The workstation will typically include a user interface adapter 16, which connects the microprocessor 12 via the bus 14 to one or more interface devices, such as a keyboard 18 a mouse 20, and/or other interface devices 22, which can be any user interface device, such as a touch sensitive screen, digitized pen entry pad, etc. The bus 14 also connects a display device 24, such as an LCD screen or CRT, to the microprocessor 12 via a display adapter 26. The bus 14 also connects the microprocessor 12 to memory 28 and storage 30, which can include ROM, RAM, etc. The environment 10 may then be interconnected to a network such as LAN, WAN, Internet, etc., via connection 32.

Software program code which employs the present invention is typically stored in the memory 28 of the standalone workstation environment. In a client/server environment, the software program code may be stored with memory associated with the server. Software program code may be embodied on any of the variety of known media for use with the data processing system, such as a diskette or CD ROM. The software program code may be distributed on such media, or may be distributed to users from the memory of one computer system over a network of some type to other computer systems for use by users of such other systems. Such techniques and methods for embodying software code on physical media or distributing software code via networks are well-known and will not be discussed further herein.

The present invention is described below in its preferred embodiment, which is as part of a Smalltalk development environment. A Smalltalk development environment may operate on any of a variety of combinations of operating systems and hardware, and will be described independent of any specific operating system and hardware. Smalltalk is a dynamic object oriented language and is referred to as a pure object oriented language since it conforms to all the basic definitions of an object oriented language, such as inheritance, polymorphism, etc. These concepts will not be discussed unless particularly important to further the understanding of the present invention herein.

Figure 2:
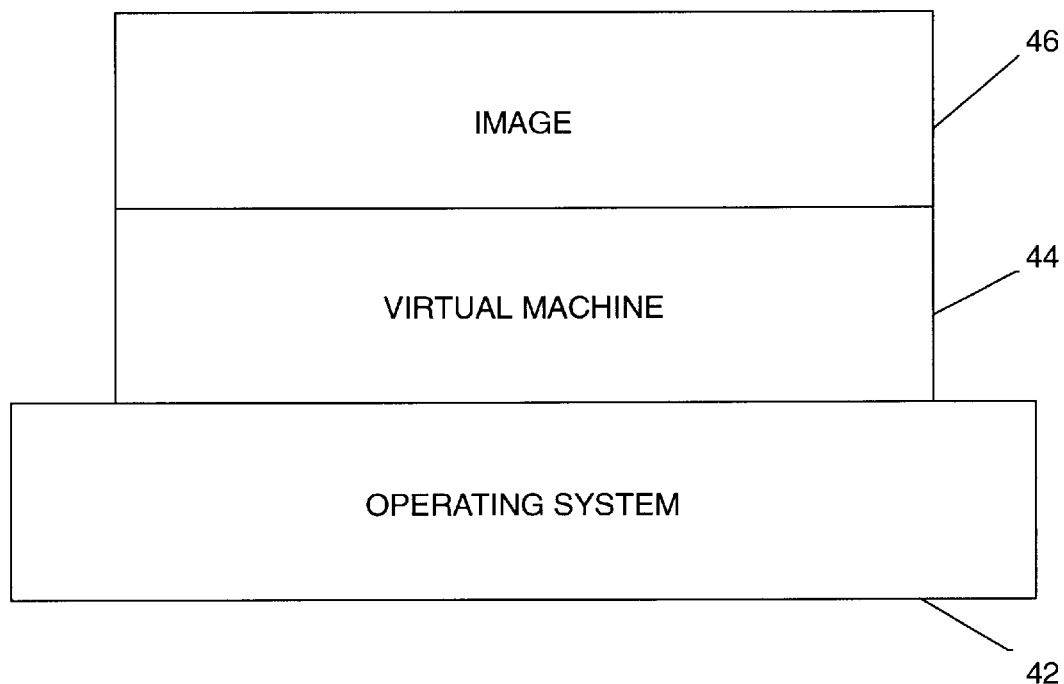
FIG. 2 illustrates the basic architecture of a Smalltalk object oriented development environment.

FIG. 2 illustrates the basic architecture of a Smalltalk object oriented development environment, such as VISUALAGE for Smalltalk from IBM. ("VISUALAGE" is a registered trademark of the International Business Machines Corporation.). The object oriented development environment is itself an application which runs on an underlying operating system 42. A portion of the development environment known as a virtual machine 44 interacts with the operating system 42. The Smalltalk development environment is hierarchical, and an image portion 46 of the development environment contains hierarchies of classes tied into the virtual machine 44 and can be viewed as logically running on top of the virtual machine 44. The image 46 is the portion of the development environment with which a developer interacts to develop an object oriented application. The image portion 46 of the development environment includes a variety of classes provided in different hierarchies which provide functions at many different levels. At a high level, an entire set of classes may comprise a framework which provides substantially complete function desired by the developer, which a developer may pull into the application being developed. On the other hand, the function may not be provided in such a neat package as a framework by the development environment, thus requiring the developer to combine relatively low level classes or individual classes or to write new classes in order to create the desired function for the application being developed.

The image 46 also includes application development tools which differ in different environments. The tools may include a class browser for viewing classes and methods, version control systems for permitting incremental development and saving of applications under development, debuggers for debugging applications created using the development environment, etc. The development environment also includes a Smalltalk compiler which links and compiles portions of the application. Smalltalk being an interpreted language, portions of the application will remain in byte-code form, which are interpreted by the run-time engine during execution.

Figure 3:
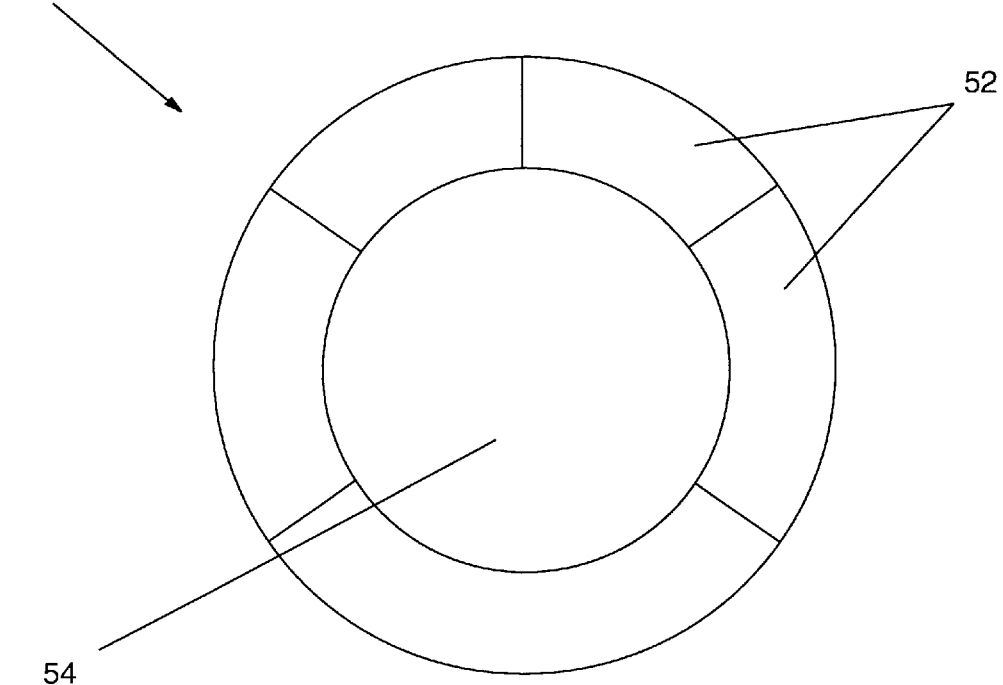
FIG. 3 illustrates an industry standard of an object.

FIG. 3 is an industry standard representation of an object 50. Methods 52 of the object 50 provide function, while a data portion 54 includes data associated with the object 50. An object is an instantiation of a class from the hierarchy of classes which a developer has designated for use in an application. The same class may be used many times in an application.

Figure 4:
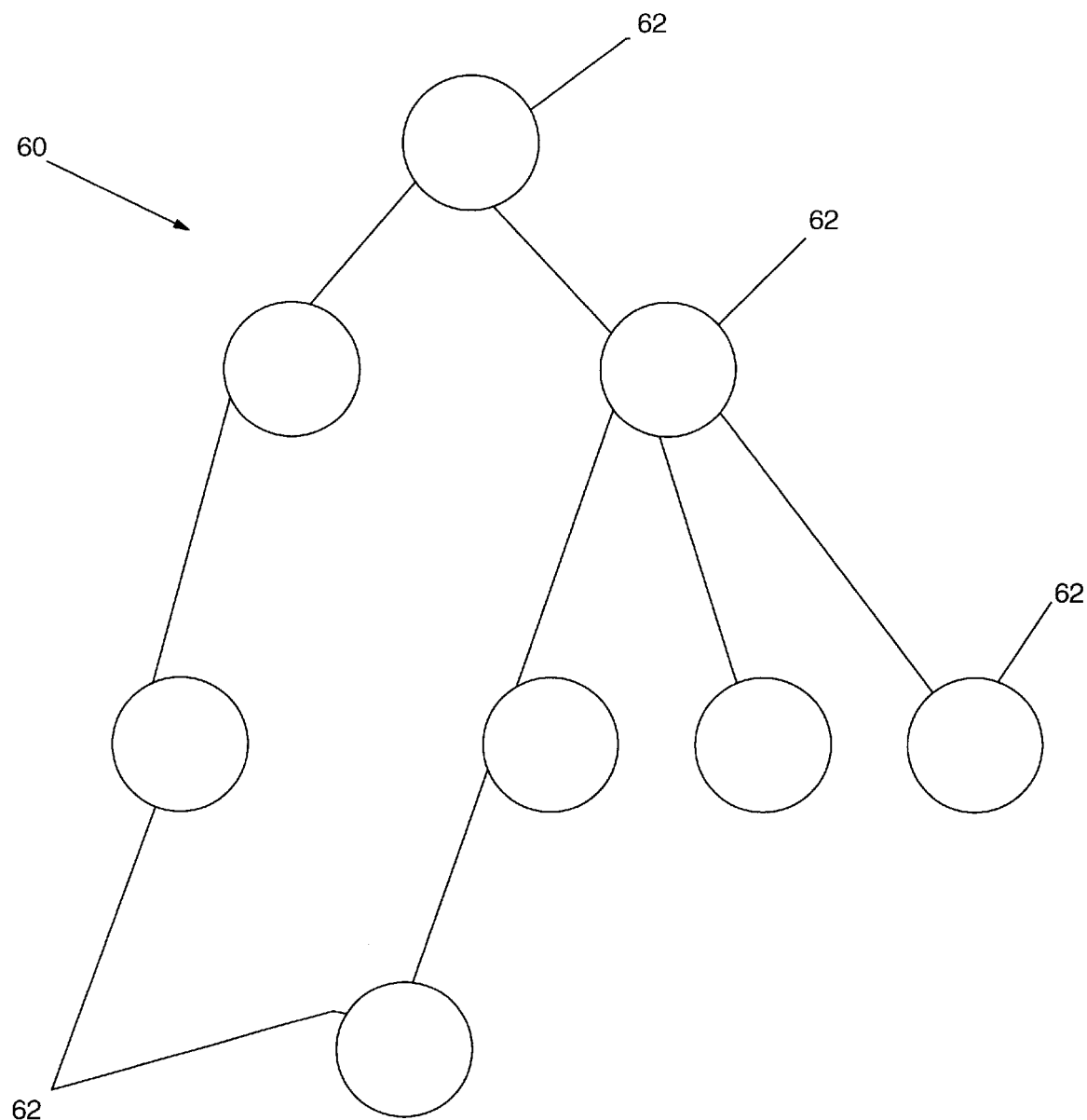
FIG. 4 illustrates a hierarchy of classes.

FIG. 4 illustrates a hierarchy 60 of classes 62. Object oriented hierarchies employ the concept of superclasses and subclasses. A class inherits all variables and methods from classes which are higher in the hierarchy of classes (superclasses). The inheriting class is referred to as a subclass of its superclasses.

Many of the weaknesses of the prior art approaches for synchronizing design with code derive from a unidirectional focus: they attempt to either infer code from the design or to infer design from code. However, code inferred from design is usually poor code and is often incomplete, while design inferred from code is similarly flawed. Rather than dispense with humanly created code or design, both should be maintained in such a way that the declared design intent remains synchronized with the actual effect of the code.

In copending application Ser. No. 08/769,910, assigned to the same assignee herein, static analysis is approached in a manner analogous to the way a virtual machine executes compiled Smalltalk code. A Smalltalk compiler converts Smalltalk source code into byte codes, which are interpreted by a virtual machine. This virtual machine (VM) supports Smalltalk, but can support other languages as well. VM architecture is that of a stack machine. Byte codes define the pushing of objects from variables onto a stack, popping objects from the stack to store them into variables, and sending messages which pop their arguments and the receiver from the stack and push the result onto the stack. The byte codes themselves live within objects (compiled methods) that are executed under control of a virtual machine. Each invocation of a method or a block is managed by a MethodContext or BlockContext object which maintains an instruction pointer into its byte codes and provides private state (method and block temps and arcs). Active contexts (i.e., those that have begun but not finished execution) are on a separate context stack with the top most context being the one the virtual machine is actively executing. Returning from a method pops this context stack.

When a Smalltalk VM executes code, three categories of activities occur: (1) interpretation of byte codes that have been previously compiled from Smalltalk methods; (2) handling exceptions, especially DoesNotUnderstand, and handling of external events; and (3) the creation and destruction of objects (memory management). Almost all of the visible behavior of Smalltalk code occurs under the explicit direction of byte codes. The consequences for static analysis, whether automated analysis or simply human efforts to read the code and deduce the design, can be dire.

When code is read to understand its effects, the actual objects are mentally replaced with generic stand-ins. In a design VM machine, qualifiers stand in for the objects so described. Signatures, similarly, stand in for methods invoked as a result of a message send. Thus, objects and message sends are well described by qualifiers and signatures respectively. Therefore, the design analog of the effect of executing code can be determined by creating a VM that "executes" Smalltalk code by replacing objects with qualifiers and messages with signatures. That is, where objects are pushed and popped to and from variables at runtime, qualifiers are pushed and popped to and from attributes by the design VM. Where messages are looked up by the VM at runtime, arguments (args) pushed, appropriate method invoked, and the return value left on the stack, signatures are looked up by the design virtual machine, arg qualifiers pushed, and the return qualifier (as determined by the signature) is left on the stack. These activities are orchestrated by byte codes at runtime and by byte code analogs called ExecutionSteps in the design VM. ExecutionSteps can be generated by the Smalltalk parser in a manner very similar to its generation of byte codes.

The following table shows the basic correspondences:

| EXECUTION MODEL | DESIGN MODEL |
| --- | --- |
| Virtual Machine | Execution Model |
| Objects | Qualifiers |
| Message Sends | Signatures |
| Contexts | ExecutionContexts |
| Variables | Attributes |
| Byte Codes | Execution Steps |

It is upon this design virtual machine that this invention is built. By executing the design virtual machine over a method, we can deduce all messages sent from that method to other objects; i.e., the method's collaborations. We visualize these deduced collaborations in three ways:

a) Object Interaction Diagrams

An Object Interaction Diagram is an industry standard diagrammatic technique which depicts the temporal ordering of collaborations in an object oriented system.

An Object Interaction Diagram shows each object involved in the execution and the collaborations between these objects. We augment the industry standard OID by adding details of method argument interaction and intermediate object provenance.

b) Object Structure Diagrams

An Object Structure Diagram is an industry standard diagrammatic technique which depicts static aspects of an object oriented system. These static aspects include the classes in the system including detailed properties of the classes, such as attributes and methods; static relationships between the classes as embodied in the intended contents of each class' attributes. We augment the industry standard OSD with a depiction of transient collaborations.

c) CRC Reports

A CRC report shows the details of a class, lists the class' responsibilities (or methods), and lists the collaborations for which the class is a client.

Because these design artifacts (OID, OSD and CRC) are produced by a static analysis of the Smalltalk code annotated with signatures, they can be generated at any time during development. They do not require that the code be completely executed or that a proper testing environment be created.

Figure 5:
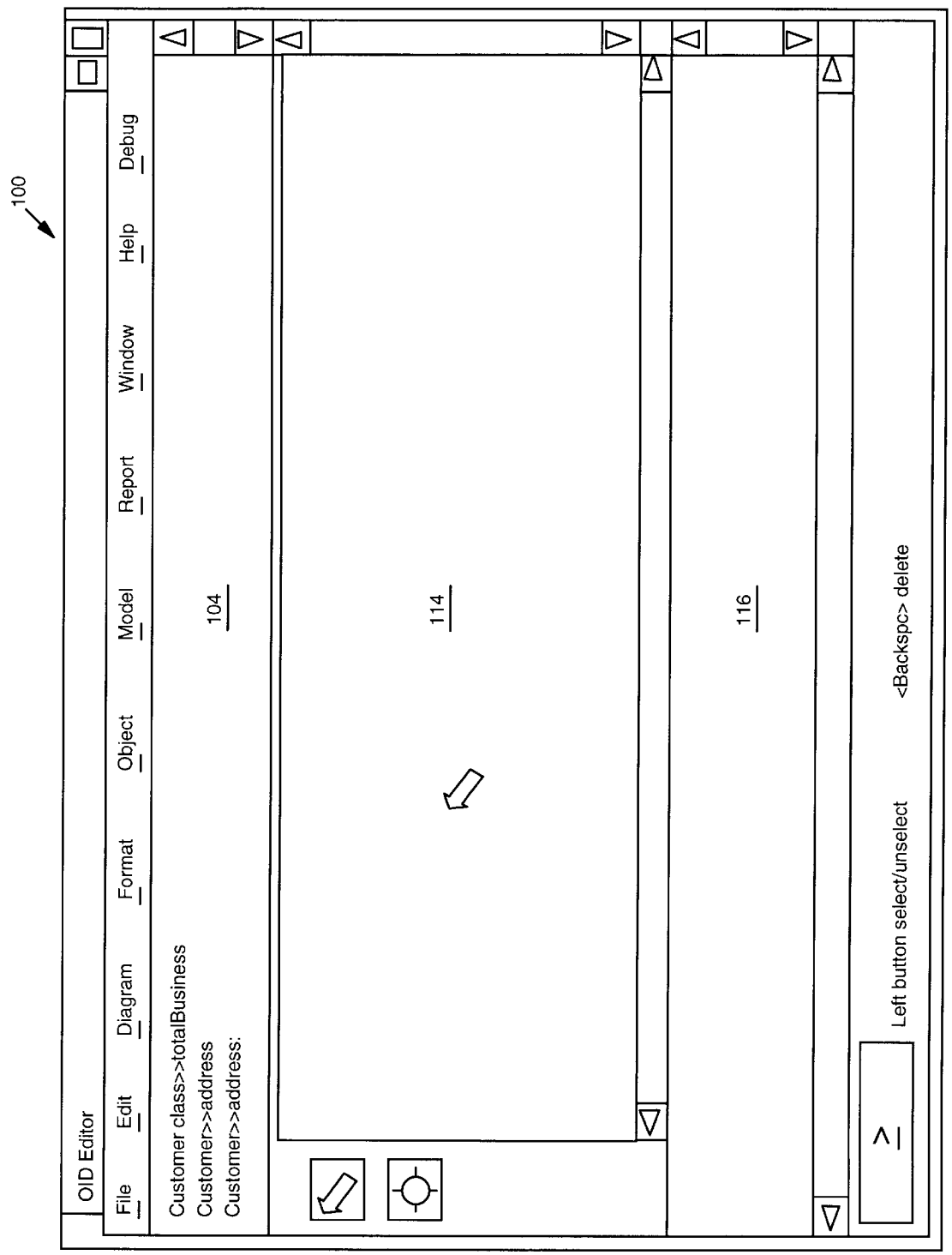
FIGS. 5–14 illustrate the present invention in use with an OID Editor.

Referring now to FIG. 5, the present invention will be illustrated in relation to one embodiment thereof. The present invention utilizes a "stepper" or code with design analysis tool such as is disclosed in copending application Ser. No. 08/769,910 assigned to the same assignee and is incorporated by reference herein. FIG. 5 contains an "Object Interaction Diagram" (OID) editor 100 window, which was created by executing a Smalltalk expression. The editor 100 has been opened on a "Customer Class"; pane 104 contains a list of methods defined in Customer. The editor 100 also contains a pane 114 for insertion of an Object Interaction Diagram and a pane 116 for display of source code corresponding to a current selection of a method (currently none shown) within pane 104.

As shown in subsequent figures, an object interaction diagram depicting the temporal ordering of the collaborations in a method will be built in pane 114. This is done by "stepping" through the design virtual machine execution of the method (pane 116) and depicting the results of each step as changes to the object interaction diagram in pane 114.

Figure 6:
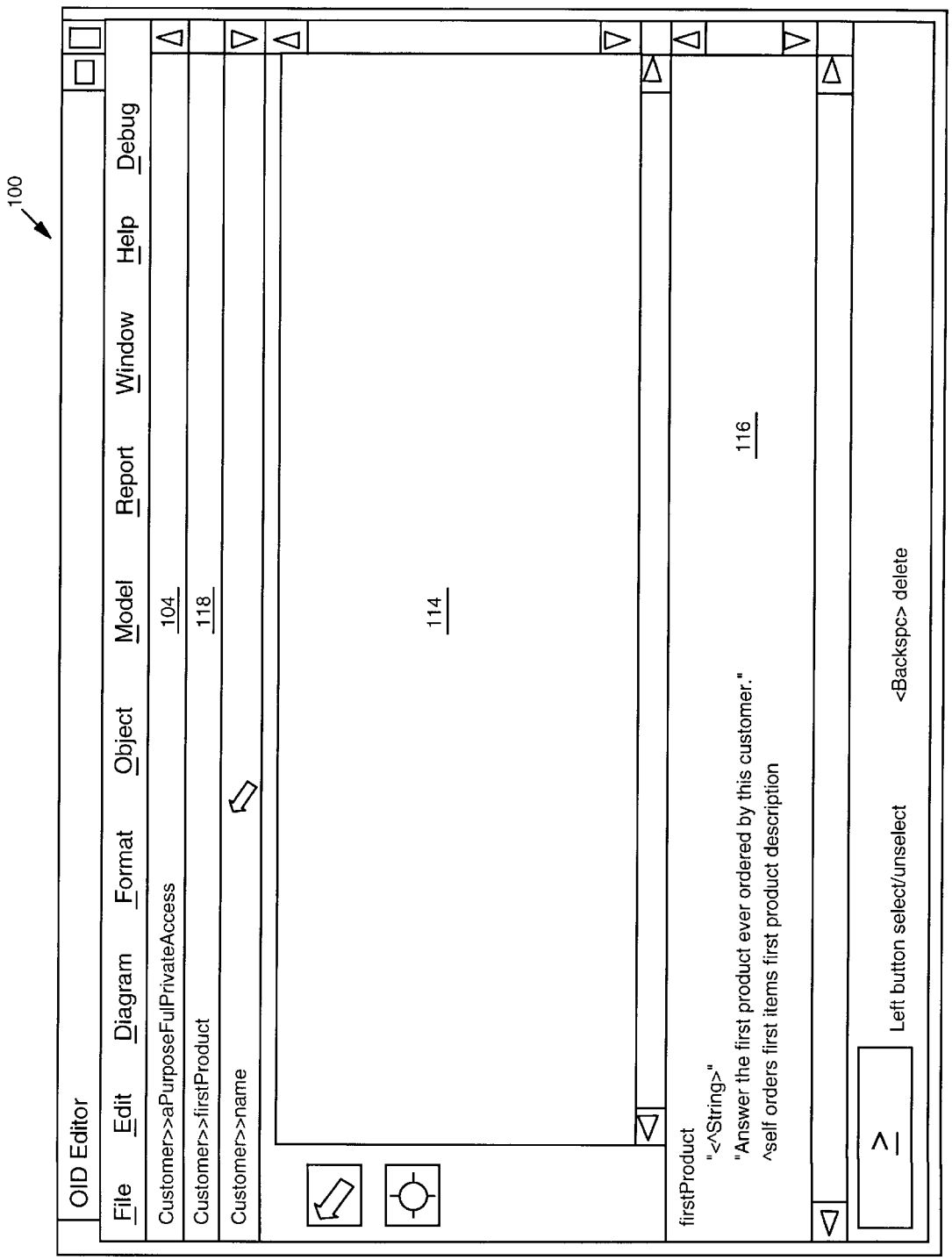

Referring to FIG. 6, a method 118 titled "Customer >>firstproduct" method 118 has been selected. Upon selection of the method 118, the source code, therefore, appears in the pane 116.

Figure 7:
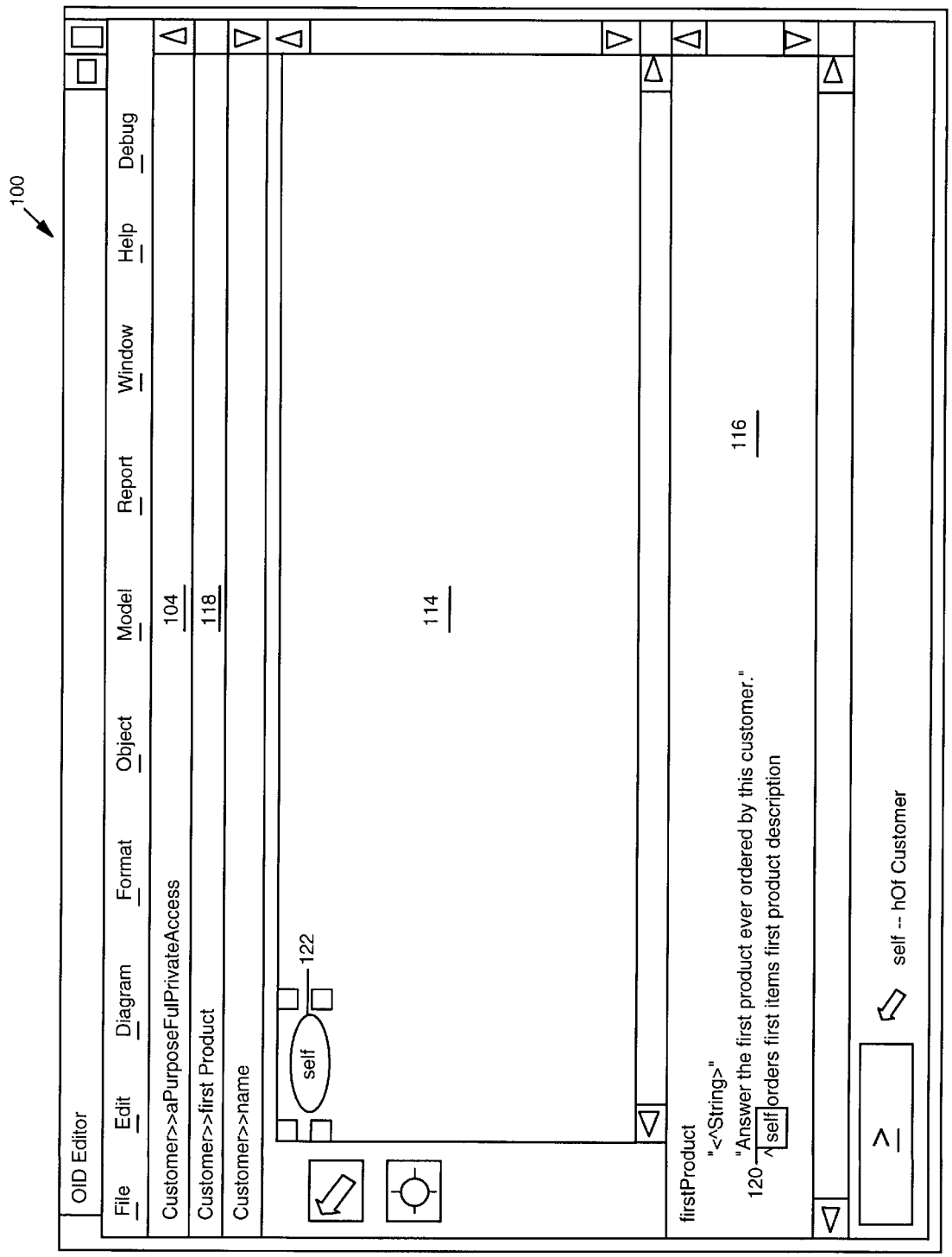

Referring to FIG. 7, a first step "self" 120 is selected for stepping. As a result of this first step, an icon 122 is placed within the pane 114 as an indication thereof.

Figure 8:
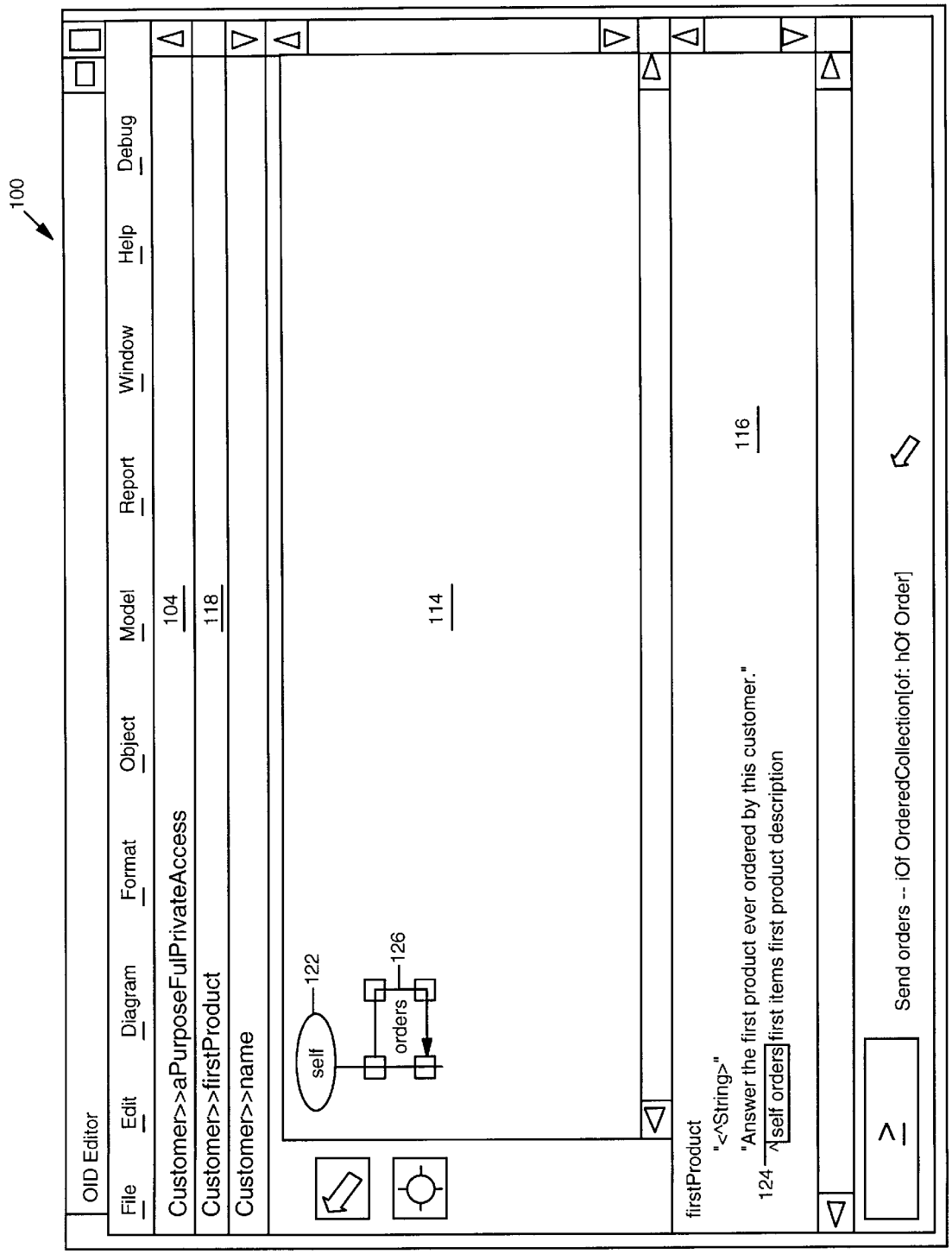

Referring to FIG. 8, the stepper then executes the second step, which is a message send "self orders" 124, as shown in pane 116. This second step is represented within pane 114 as a recursive message send from self to self, titled "orders" 126.

Figure 9:
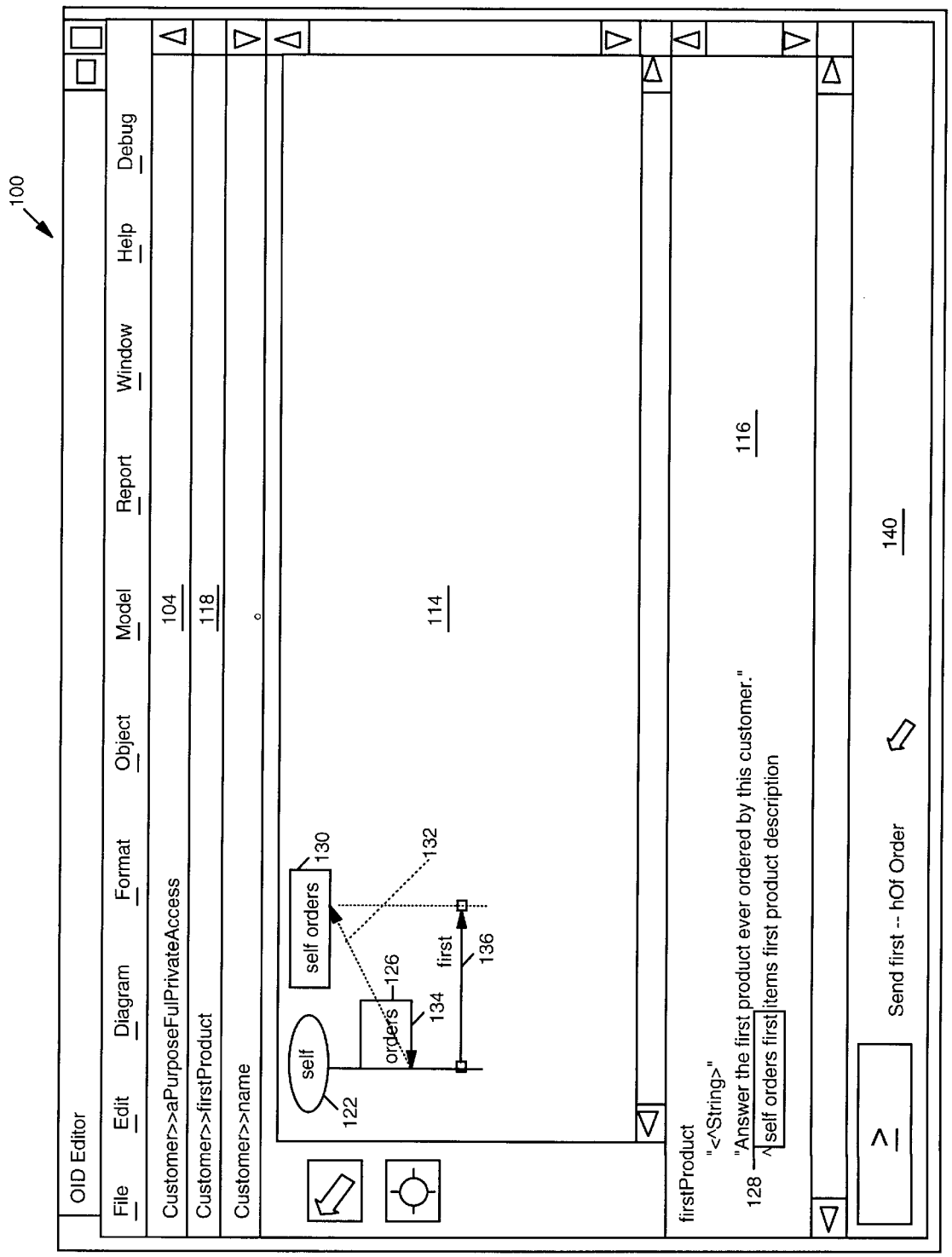

Referring to FIG. 9, the next step in the execution of the source code, as shown in pane 116, is "self orders first" 128. This step sends the "first" message to the object that resulted from the "self orders" message, as shown in FIG. 8. An icon representing the object result of the "self orders" message is shown to the right of the self icon 122, and is generally indicated by the reference numeral 130. A diagonal line 132 is drawn from the self orders arc 134 to the icon 130 which indicates which message send caused the new icon to appear. A message send arc 136, labeled "first", from the self icon 122, represents the actual message send. A message line 140, at the bottom of the window 100, indicates what kind of object the message send results in, i.e., "hOf Order", meaning the object is an instance of class Order, or one of its subclasses.

Figure 10:
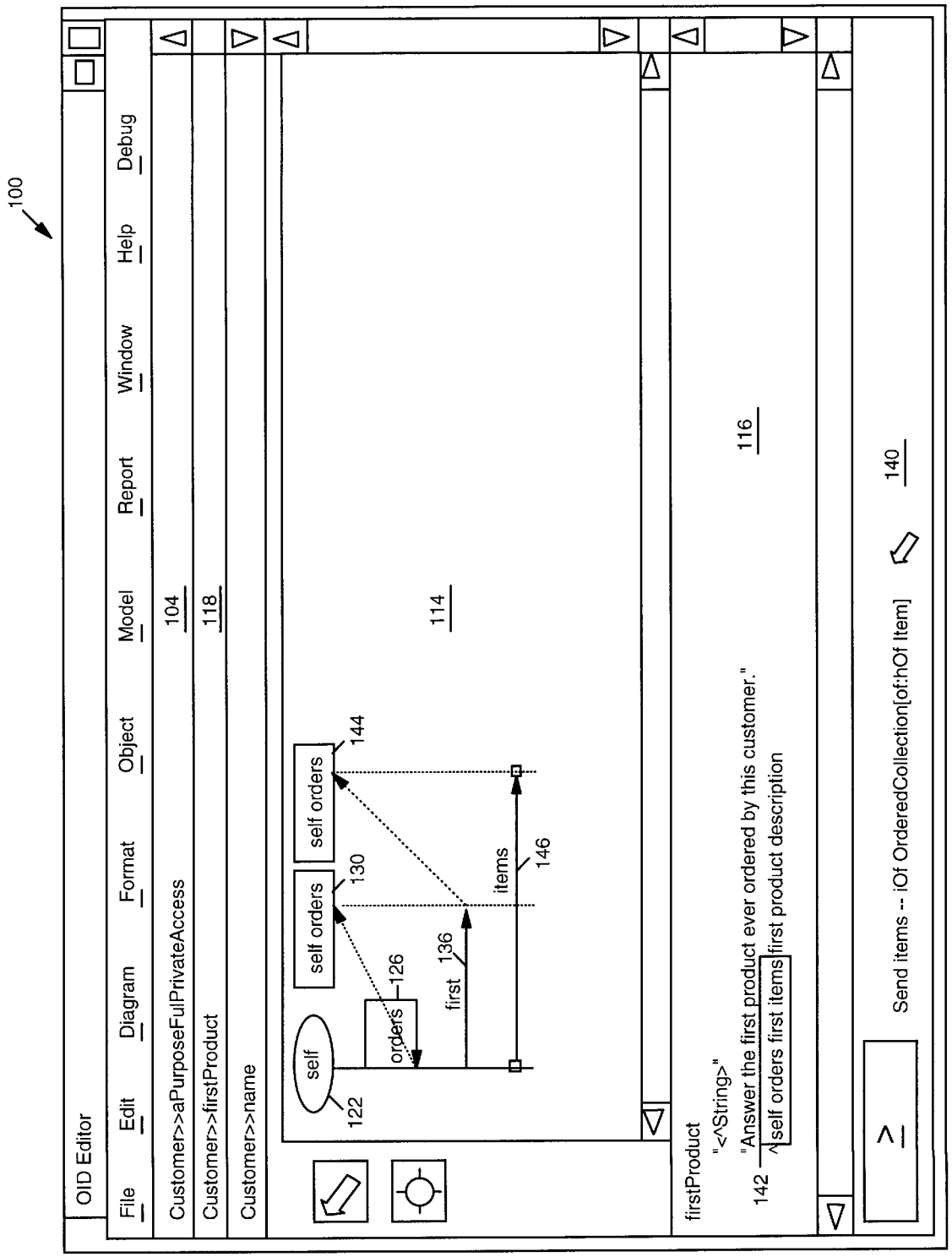

Referring to FIG. 10, the next step "self orders first items" 142 is executed by the stepper. A new "self orders" icon 144 appears. A message send arc 146, titled "items", from the self icon 122 to icon 144 is also displayed. The result of this message send is displayed in the message line 140, at the bottom of the window 100. The result is an object which is specified as "iOf OrderedCollection[of:hOfItem]", meaning the object is an OrderedCollection, containing instances of class Item, or one of its subclasses. This is considered to be a collaboration with Order.

Figure 11:
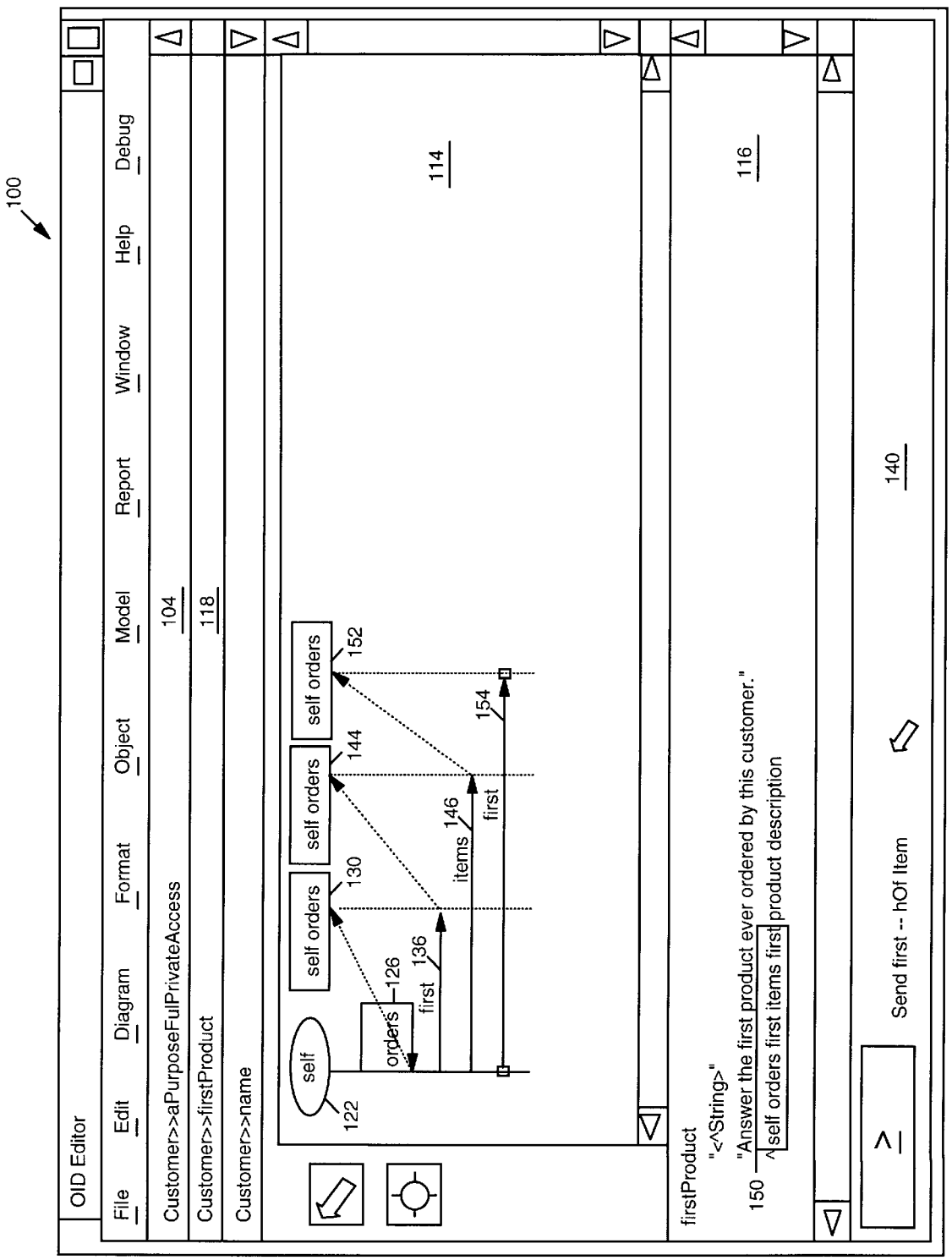

Referring to FIG. 11, the stepper executes the next step "self orders first items first" 150. A new "self orders" icon 152 is added. A message send arc 154, titled "first", represents the actual message send. The result of this message send is an object specified by "hOf Item", meaning the object is an instance of the class Item, or one of its subclasses.

Figure 12:
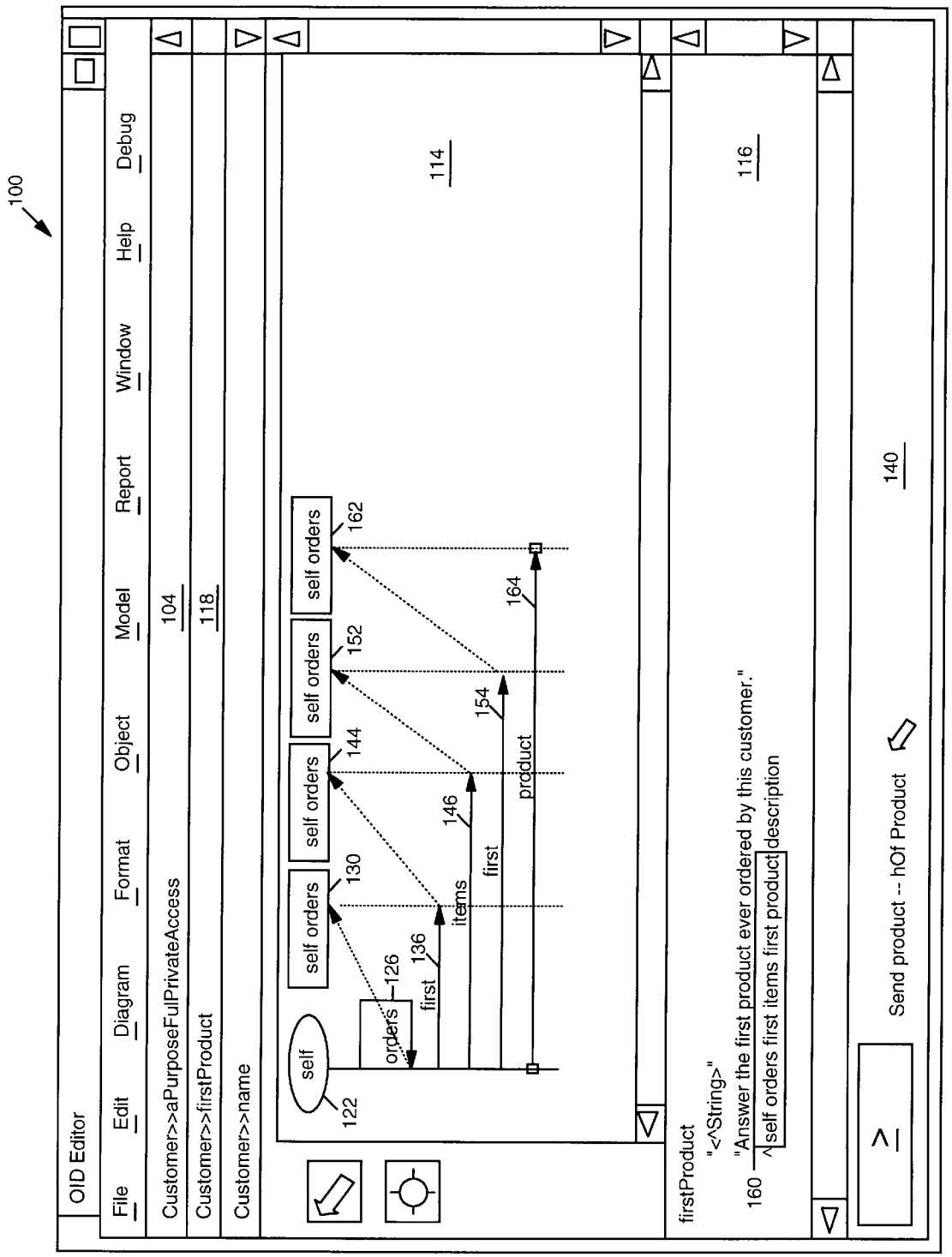

Referring to FIG. 12, stepper initiates the next step "self orders first items first product" 160. Another new "self orders" icon 162 appears. A message send arc 164, titled "product", is also displayed. The result of this message send is an object specified by "hOf Product", meaning the object is an instance of the class Product, or one of its subclasses. This is considered to be a collaboration with Item.

Figure 13:
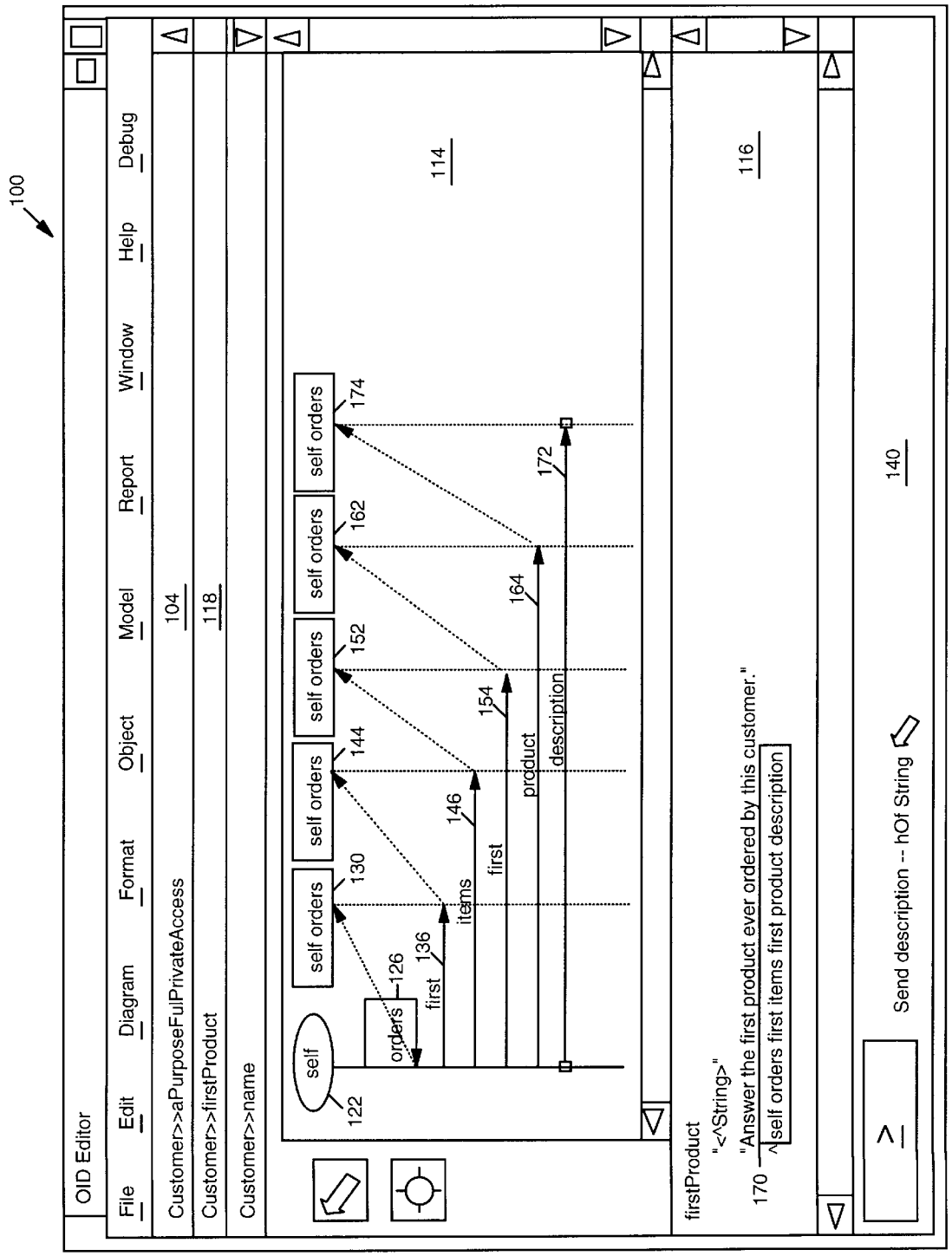

Referring to FIG. 13, the stepper then executes the next step in the code "self orders first items first product description" 170. This step shows the collaboration with Product by sending the "description" message 172. The kind of object resulting from this message send is specified by "hOf String", meaning the object is an instance of the class String, or one of its subclasses.

Figure 14:
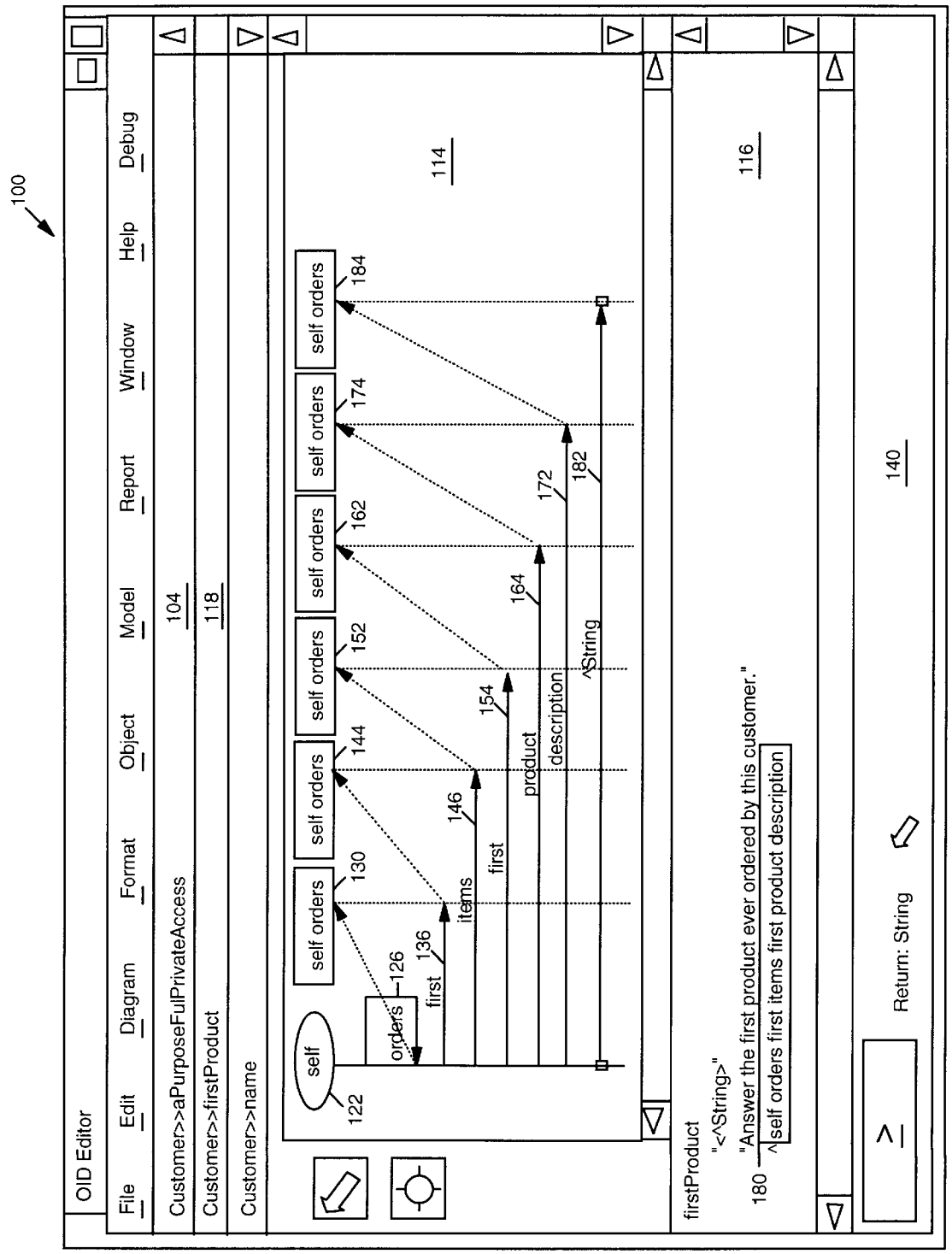

Referring to FIG. 14, the final step is executed by the stepper by executing the return "^self orders first items first product description" 180. The object returned is an arc 182, titled "^String". This computed result corresponds to the designers declared intent. The designers declared intent is specified by the method signature. The method signature appears as a comment in the method source "<^String>". FIG. 14 shows the final and complete object interaction diagram showing all the objects and all the collaborations in the firstProduct method for Customer.

Figure 15:
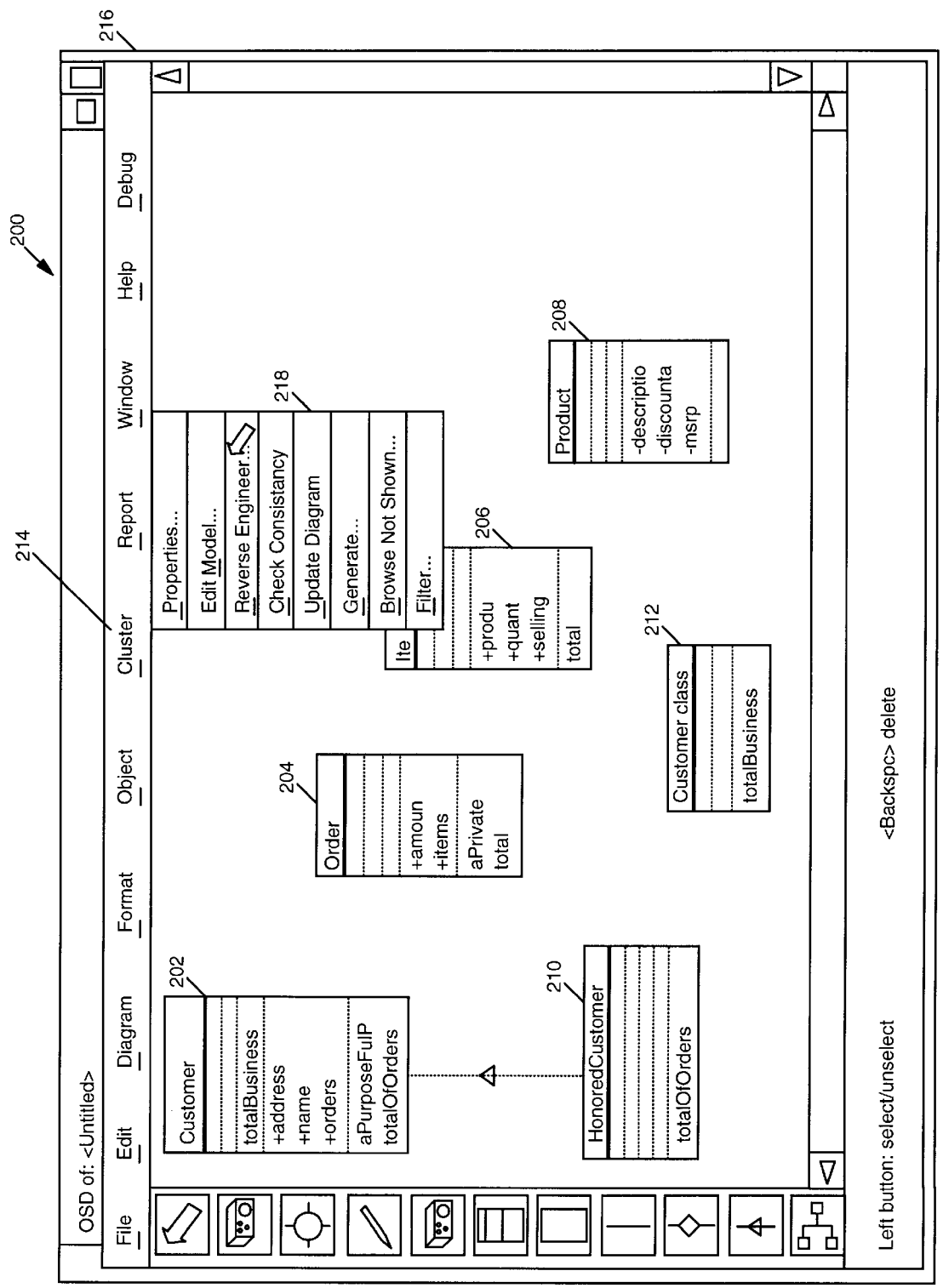
FIGS. 15–17 illustrate the present invention in use with an OSD Editor.
Figure 16:
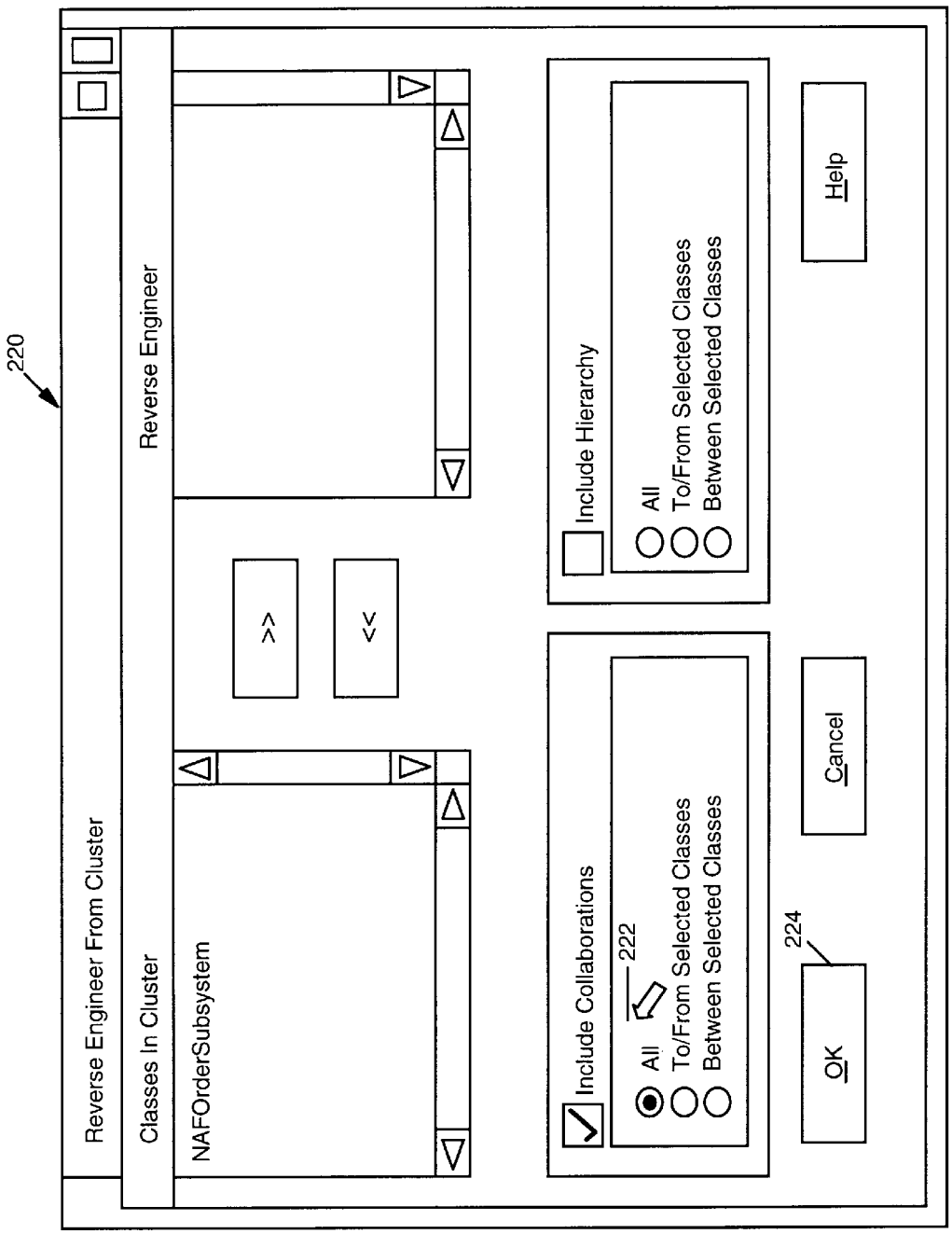
Figure 17:
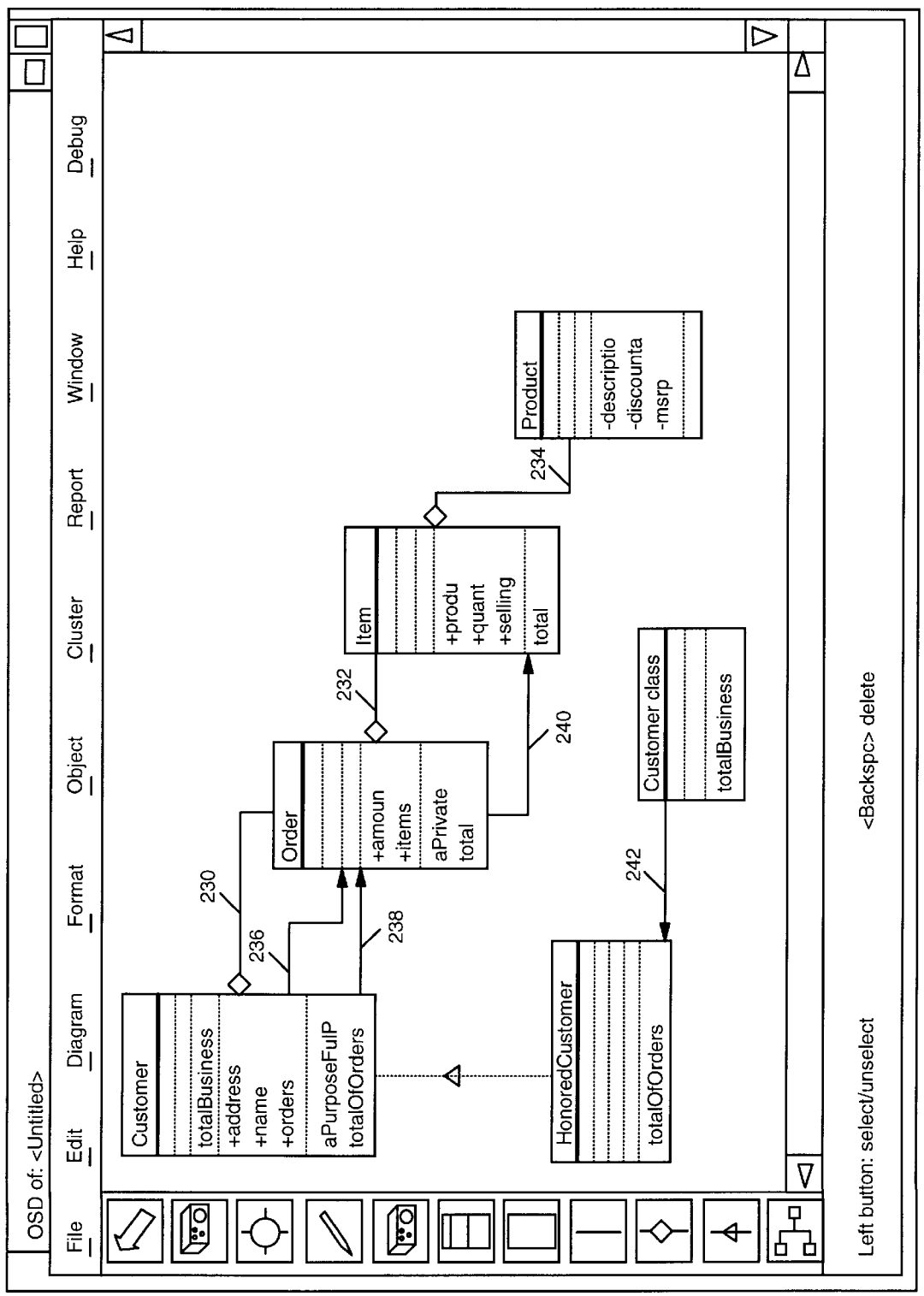

Referring to FIGS. 15–17, an illustration of the present invention is shown, describing how collaboration lines between classes on an Object Structured Diagram can be reverse engineered and drawn for each class, based on an analysis of the collaborations of each method in the class. Referring first to FIG. 15, an OSD window 200 (created by executing a Smalltalk expression) is illustrated. The window 200 shows six classes titled Customer 202, Order 204, Item 206, Product 208, Honored Customer 210, and Customer Class 212. There are no collaboration lines shown between the classes. The connection between Customer class 212 and Honored Customer class 210 merely indicates a subclass-superclass (hierarchy) relationship. A user has selected cluster 214 from a menu bar 216. The user then selects reverse engineer 218 on the drop down menu provided.

Referring to FIG. 16, a reverse engineering dialog window 220 is shown. Window 220 appears upon selection of reverse engineer 218, shown in FIG. 15. This dialog offers the user the opportunity to draw on the diagram classes, collaborations and hierarchy relationships from the underlying Smalltalk application. No classes are listed since all the classes in the application already appear on the diagram. The options chosen are to reverse engineer all the collaborations (see 222) involving classes on the current diagram. Upon selecting the okay push-button 224, the result of the collaboration reverse engineering is the appearance of collaboration lines between classes, as shown in FIG. 17. Lines 230, 232 and 234 all indicate static or structural collaborations detected. Lines 236, 238, 240, and 242 all indicate dynamic or method send collaborations. Lines 230, 232 and 234 were created by examining the design intention of the attributes in each class on the diagram. For example, line 230 was derived by examining the design intention for the three attributes of Customer: address, name, orders. Address and name attributes are both described by the qualifier "hOf String", meaning that the designer intended these attributes to each contain an instance of class String or instance of any subclass of String. Because of the collaboration filter used (see FIGS. 22–27 for further explanation), no collaboration line is drawn for these collaborations. The attribute "orders" is described by the qualifier "iOF OrderedCollection [of:hOf Order]", meaning it was the designer's intention that the orders attribute contain an instance of the OrderedCollection class, and the OrderedCollection instance contain instances of class Order, or instances of any subclass of Order. Because this collaboration is not filtered out (again see FIGS. 22–27 for further explanation), it appears as a line 230 between Customer 202 and Order 204. A similar mechanism is used in the creation of line 232 (attribute items in class Order is qualified as "iOF OrderedCollection [of:hOf Item])" and line 234 (attribute product in class Item is qualified as "hOf Product").

Lines 236, 238, 240 and 242 represent transient collaborations, (collaborations implied by message sends within methods defined in the class). These lines are created by executing the design virtual machine on each method in the class, deducing the collaborations in each method and aggregating these deduced collaborations. This set of deduced collaborations is then filtered using the collaboration filter described in FIGS. 22–27. Those collaborations that are not filtered appear on the diagram. For example, line 236 represents the collaboration from Customer>>aPurposefulPrivateAccess to Order>>aPrivateMethod. Line 238 represents the collaboration Customer>>totalOfOrders to Order>>total. There is no other collaboration from any method defined in Customer that was not filtered out by the collaboration filter.

Figure 18:
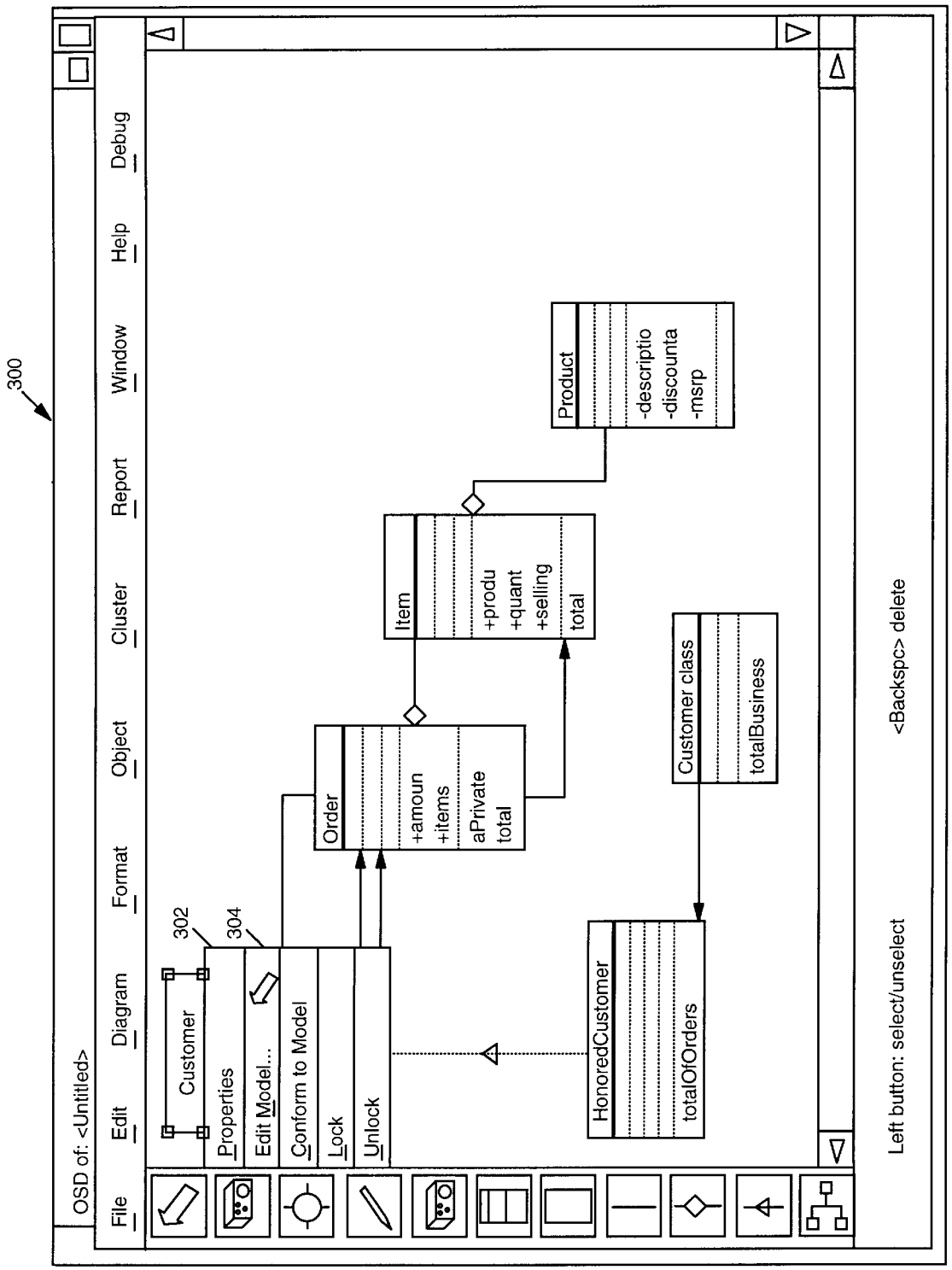
FIGS. 18–21 illustrate the present invention in use to show collaborations implied by a code change.

Referring to FIGS. 18–21, the present invention is illustrated to show how collaborations implied by a change in the code can be detected and the diagram updated to reflect such changes. Referring first to FIG. 18, the same diagram as shown in FIG. 17 is shown in window 300. A pop-up menu 302 is used to select "Edit Model" 304 to edit the underlying code forming the class. This simulates code modification after design has been completed, creating a potential deviation from design.

Figure 19:
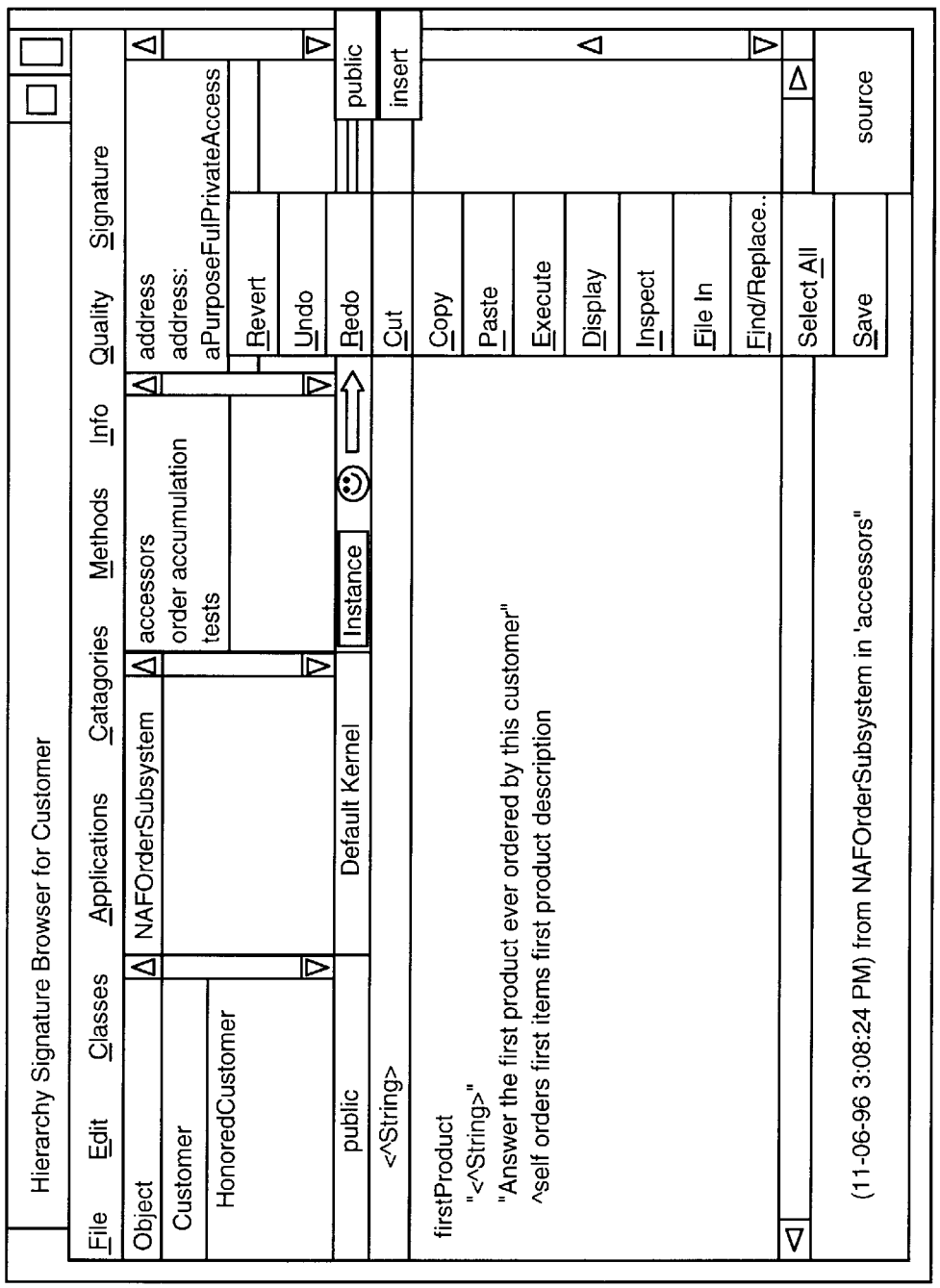
Figure 20:
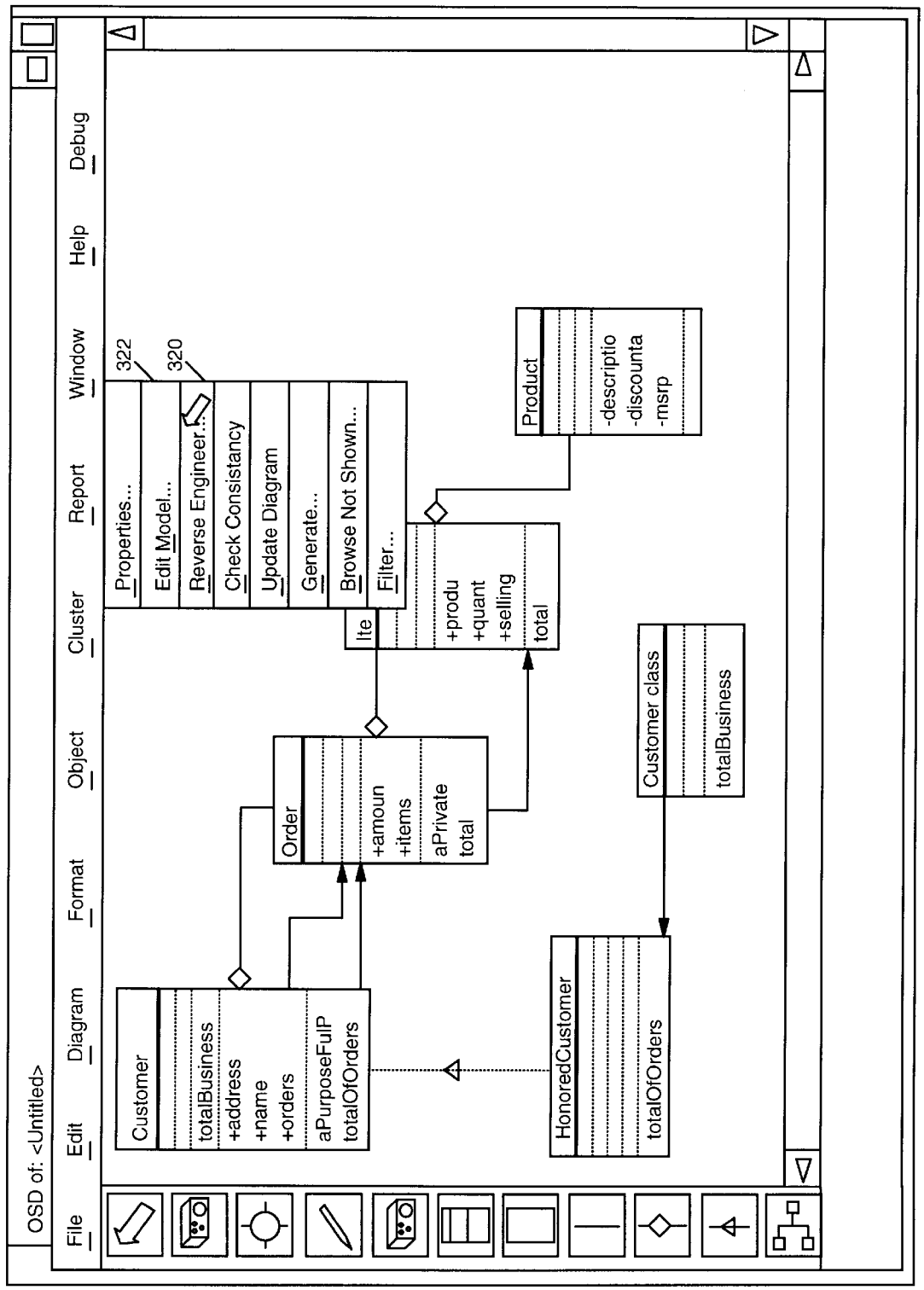
Figure 21:
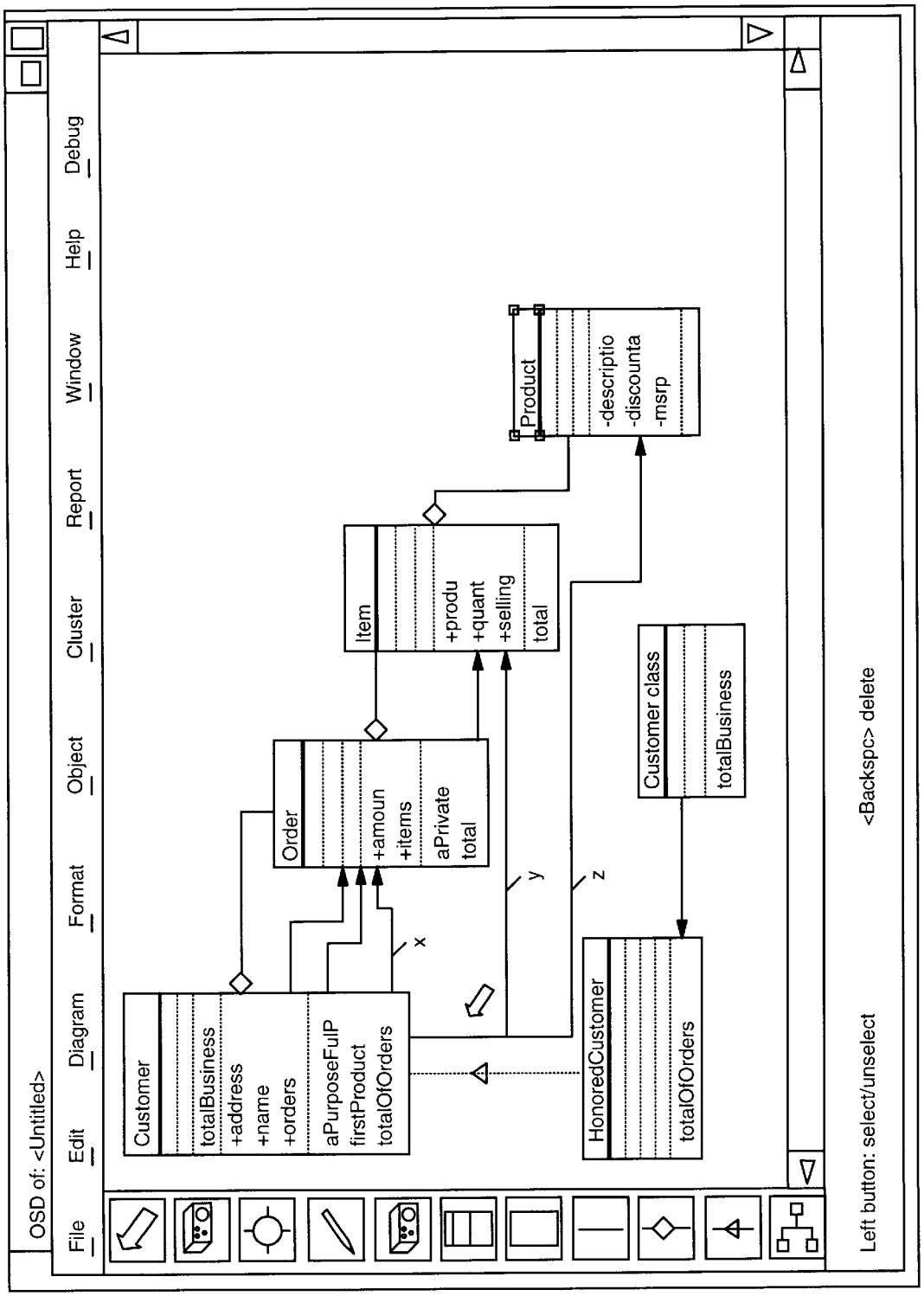

Referring to FIG. 19, a method has been added to Customer, implying a new collaboration with Order (self orders first)(previously a collaborator) and collaborations with the brand new collaborators Item (self orders first items first) and Product (self orders first items first product description). By selecting reverse engineer 320 in a drop down list 322, as depicted in FIG. 20, the diagram is updated with new collaborations in the same fashion as the collaborations were created in the first place, i.e., reverse engineering. In FIG. 21, the diagram is updated to show the additional collaborations implied by the new method. Lines x, y and z represent the collaborations from "Customer>>firstProduct" to "Order>>items", "Item>>product" and "Product>>description", respectively.

Figure 22:
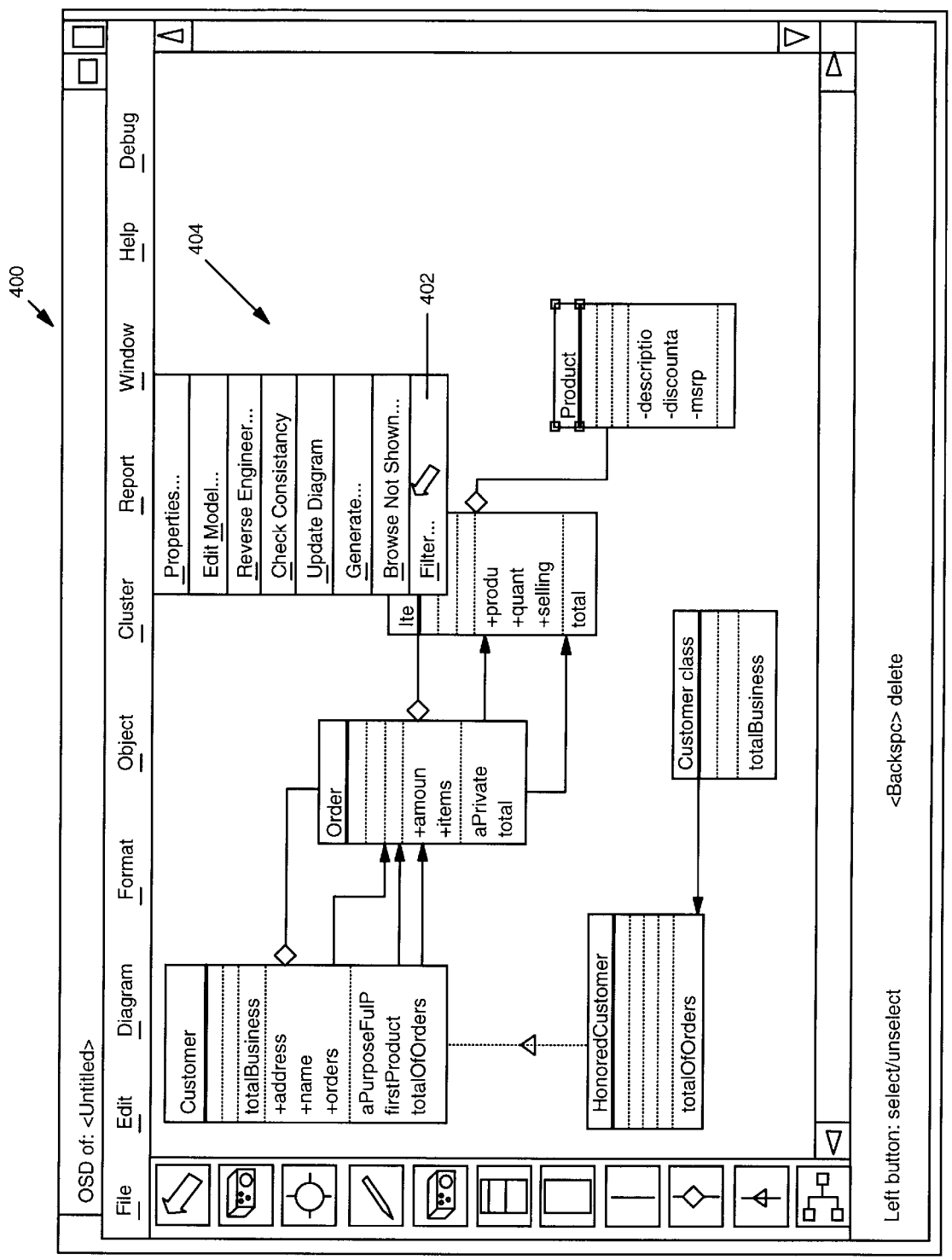

Referring next to FIGS. 22–27, an illustration of how an application filtering mechanism can be applied to suppress depiction of collaborations with classes defined in a base image. If all collaborations are shown, an overwhelming amount of detail would render the diagram useless. Referring first to FIG. 22, an OSD window 400 shows a normal view in which depiction of collaborations with classes defined in the base image is suppressed. By selecting filter 402 from a drop down menu 404, an application filter may be modified to control suppression of collaborations.

Referring to FIG. 23, a standard Smalltalk inspector window 406 is opened on an application filter (class name NAFDiagramFilter). The filter is specified by listing the names of the applications. The applications can be included in the specification with a wild card (*) character, specifying that all applications matching that pattern are to be included in the filter.

Referring to FIG. 24, the list of applications to be filtered is computed based on the filter specification, by sending a message to the application filter object. FIG. 24 shows the list of applications to be filtered out. The diagram uses the application filter by filtering out those collaborations that are with the class defined in one of the applications that appear in a list of applications to be filtered.

Figure 25:
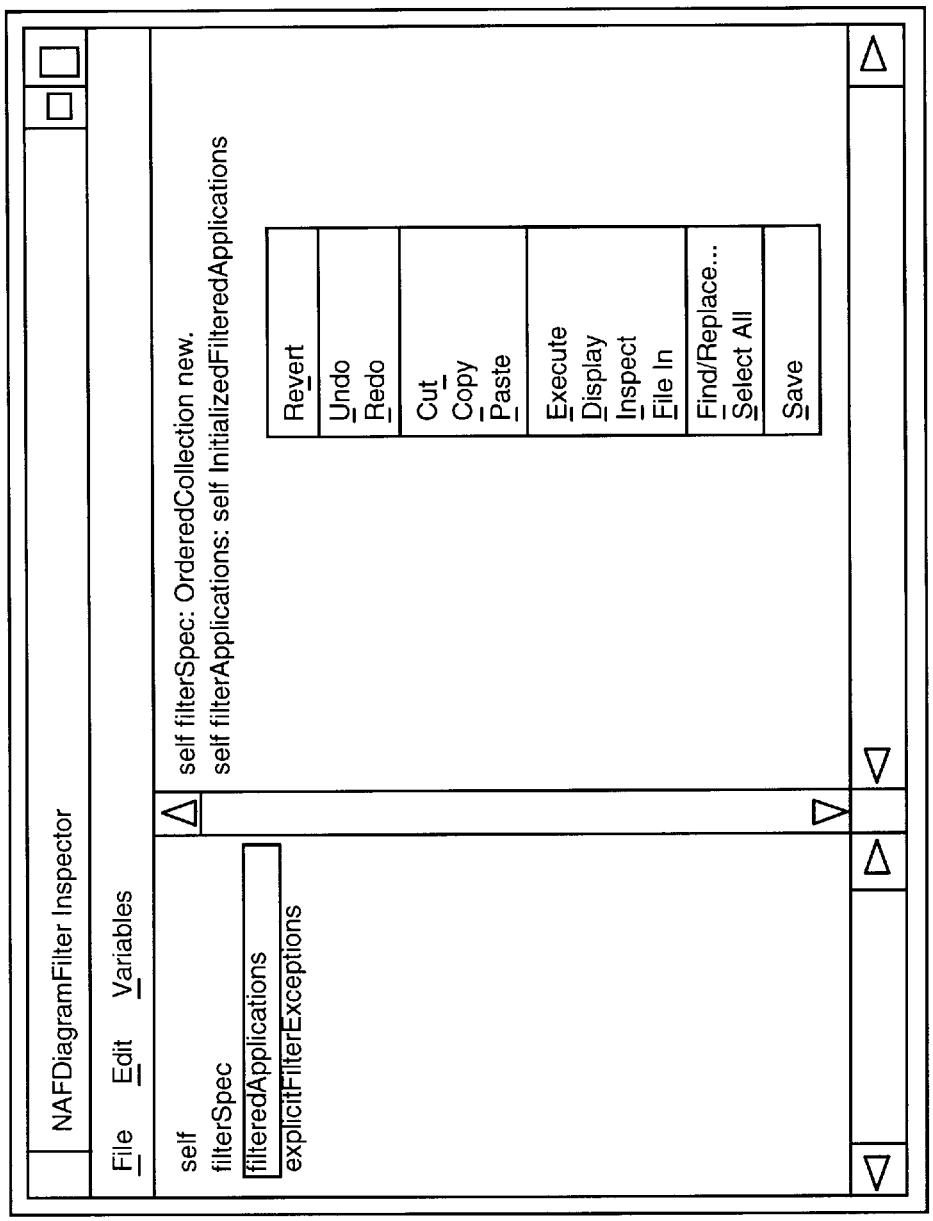

Referring to FIG. 25, the filter specification is changed to an empty collection, meaning that no application is to be included in the list of applications to be filtered. This will eliminate the suppression of depiction of collaborations with classes defined in the base image.

Figure 26:
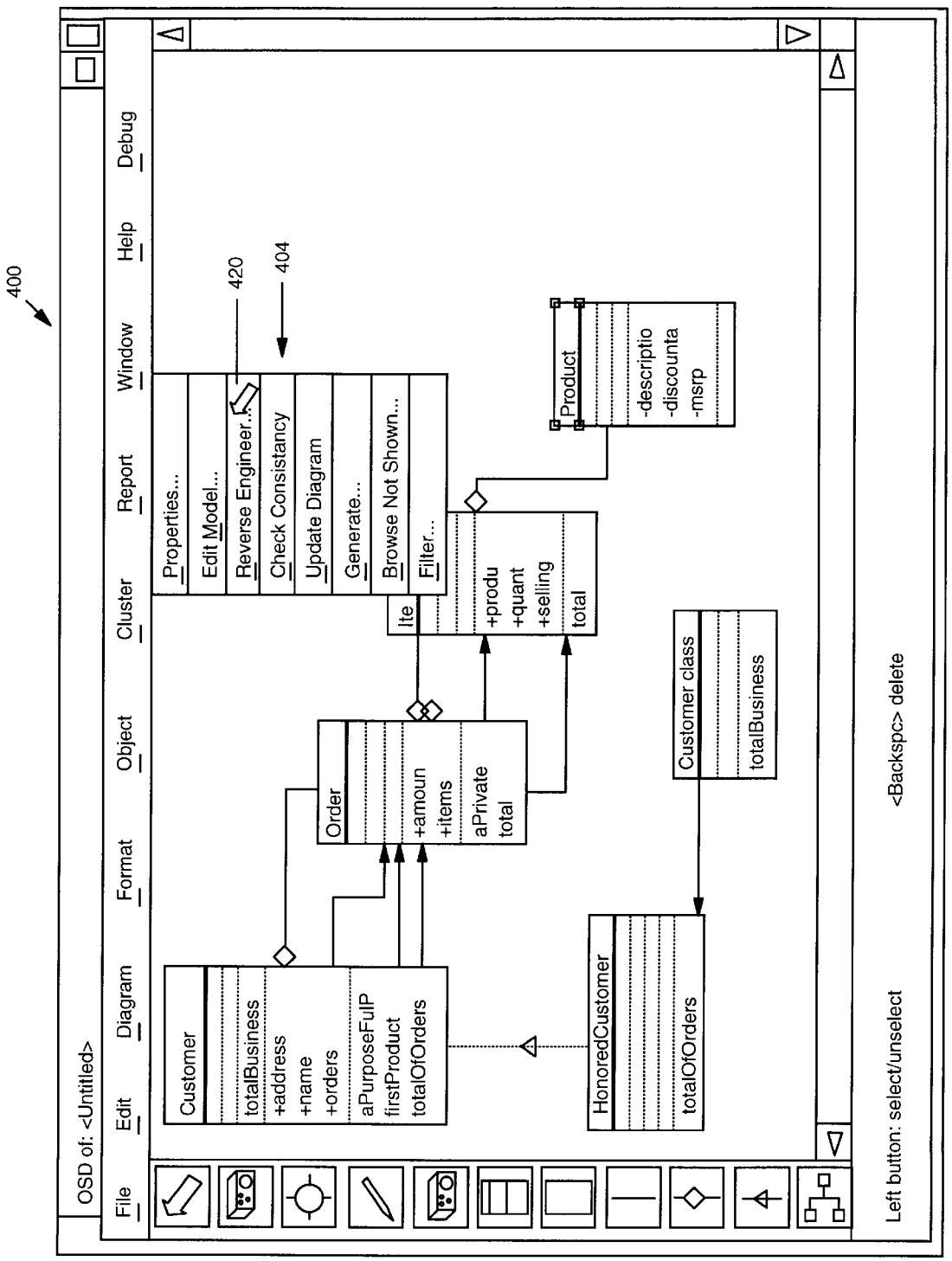
Figure 27:
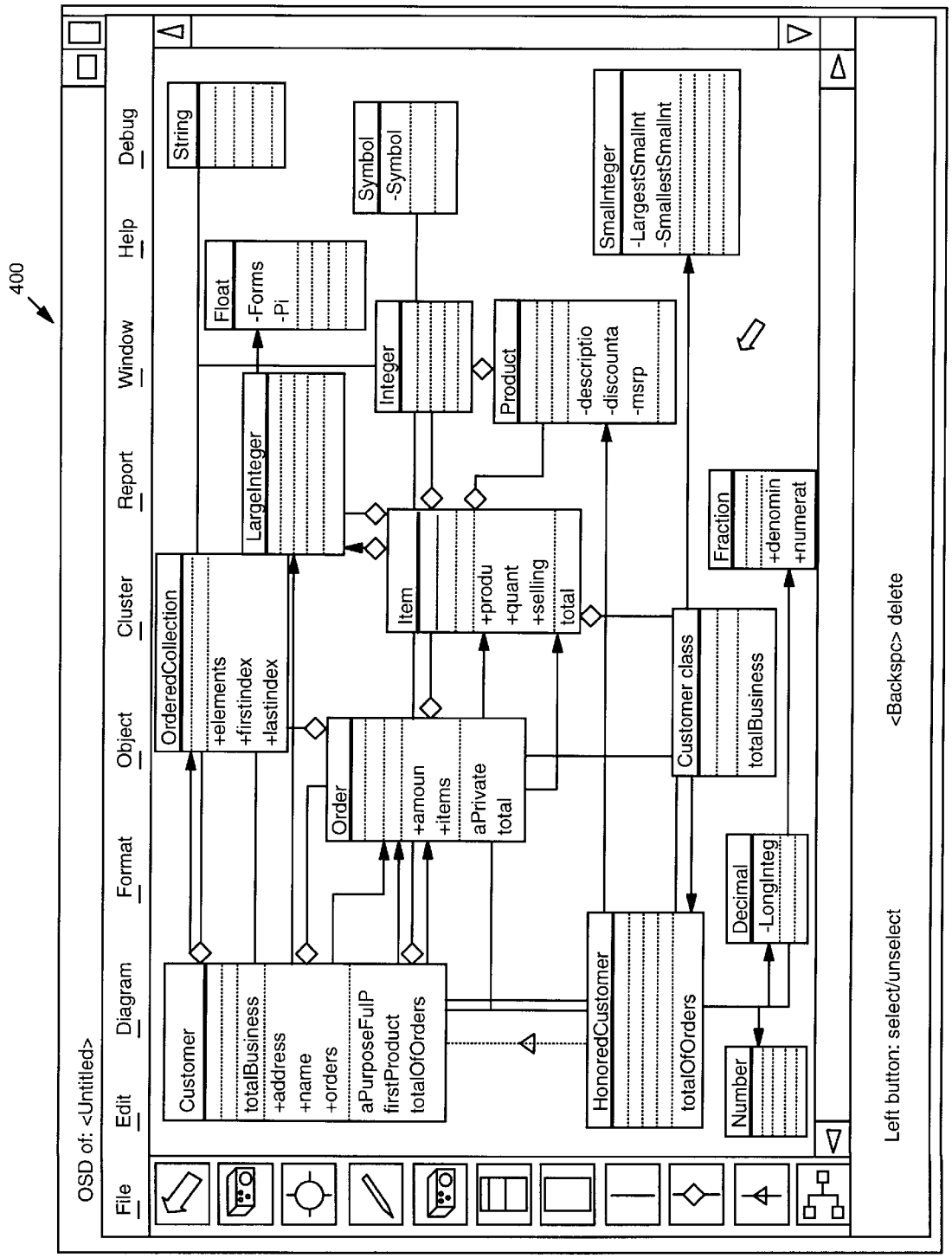

Referring to FIG. 26, reverse engineer 420 is selected from the pull-down menu 404 in window 400. Reverse engineer 420 is selected to depict any collaborations not shown previously on the diagram. Since the application filter specification has changed, there will be several collaborations detected that need to be displayed on the diagram. Referring to FIG. 27, all the collaborations are now shown on the diagram in window 400. Depicting collaborations with the base classes almost tripled the number of classes shown on the diagram and significantly increased the number of collaboration arcs. No amount of diagram rearrangement would make the diagram readable. There is simply too much information on the diagram; most of which is not interesting to the designer. Therefore, the filter used with the present invention illustrates how, by its proper use, the diagrams are made more usable to the designer.

Figure 28:
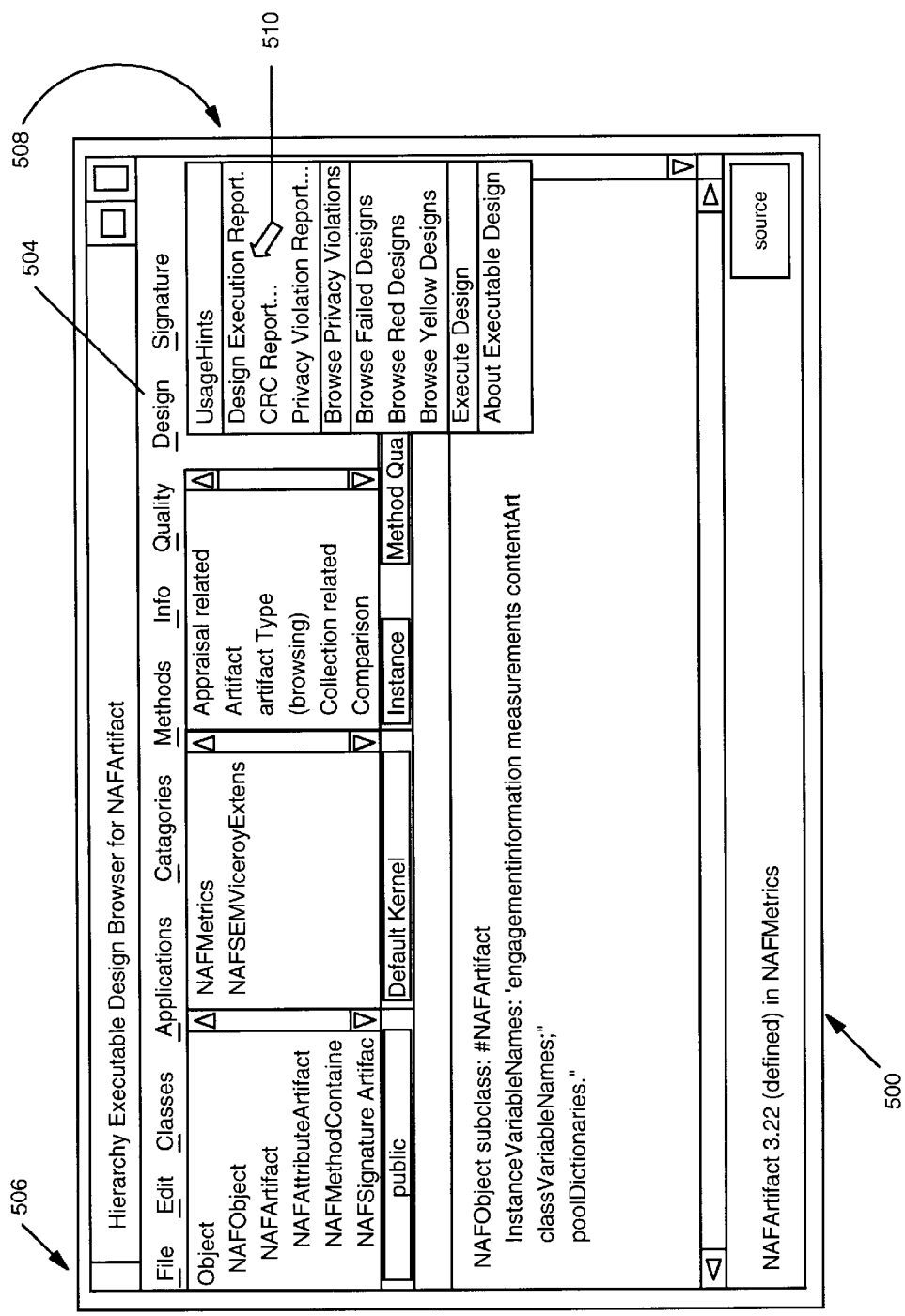

The present invention can also produce CRC reports using collaboration deduction from the execution of a design virtual machine. FIG. 28 shows a hierarchy browser 500 on a sample class (NAF Artifact class 502). The hierarchy browser 500 may be created, for example, by choosing the Browse Hierarchy menu item from a Smalltalk menu on the IBM Smalltalk Transcript Window. The hierarchy browser 500 is a modification of the standard hierarchy browser provided with IBM Smalltalk. Modifications include a design 504 selection in a menu bar 506, as shown. Within a pull-down menu 508, CRC Report 510 is about to be selected.

Figure 29:
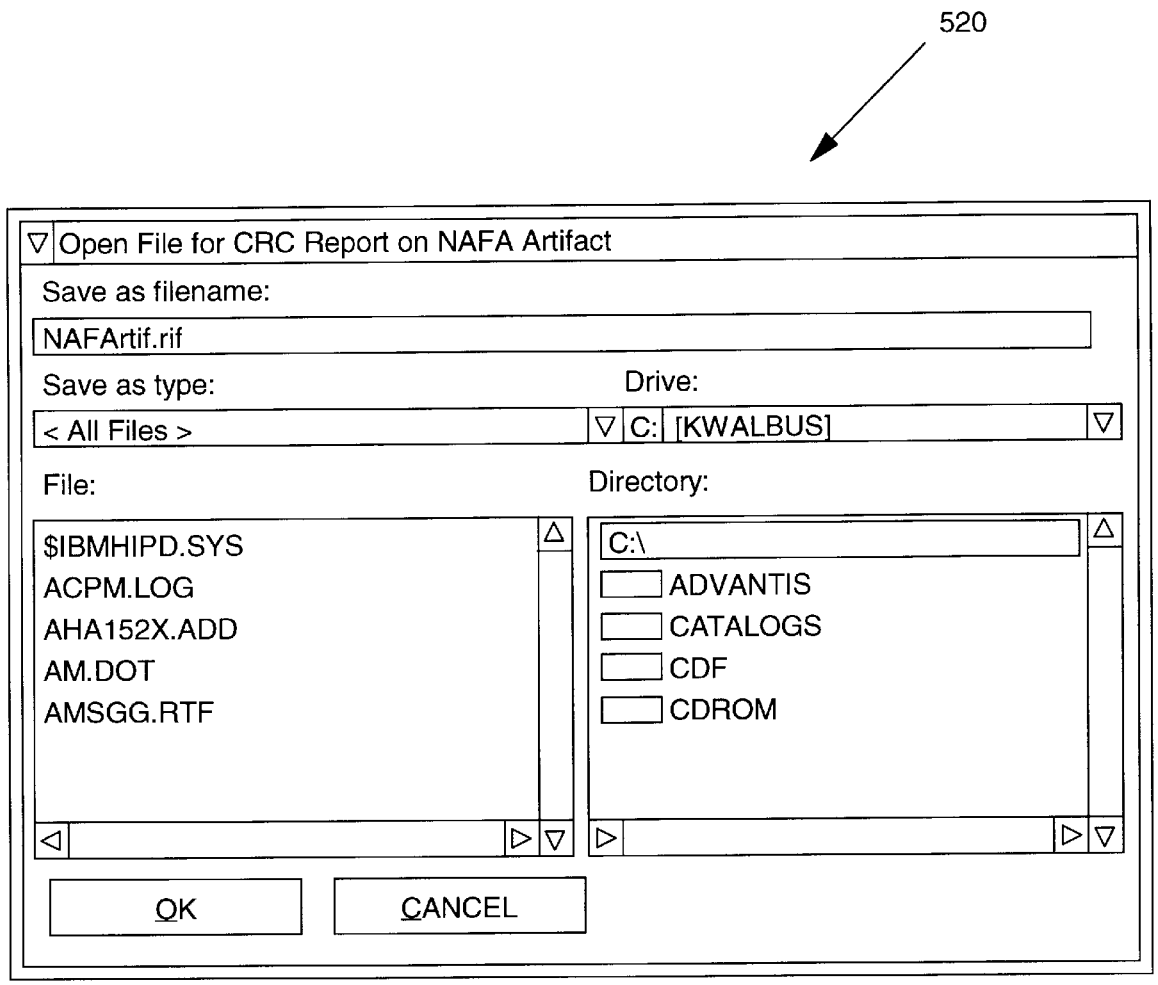

Referring to FIG. 29, a standard file dialog 520 determines which file on the operating system the CRC report will be placed in. The CRC reporting mechanism generates a file in Rich Text Format containing a CRC report. The CRC report may be created from the information in the class at any time during development, but it is typically completed at the time the system is completed and ready to deploy. The style CRC report is one defined for use by Footprint Software Inc. A sample of a CRC report on the NAFArtifact class is shown in FIGS. 30A and 30B. The file is produced in the Rich Text Format, allowing it to be opened by many industry standard wordprocessors, for example, Microsoft Word 6.0. The CRC report is divided into a plurality of sections 540, 542, 544, 546, 548, 550, 552, 554, etc. Each section repeats for each named method grouping (category), which lists the name of the category, followed by several subsections, one for each method defined in the category. For each method, the method selector is listed, followed by a table. The table lists for that method the kinds of parameters for the method (in the form of qualifiers derived from this method's signature), the kind of object returned by the method (in the form of qualifier derived from the method's signature), a method description (derived from the method comment), a list of collaborators (derived from deducing all the collaborations in the method using the design virtual machine execution in the fashion described earlier (i.e., OSD collaboration deduction) and filtering them using the collaboration filter in the fashion previously described), the access (whether the method is defined as public or private), and whether the method must be overridden (by deducing whether the message 'self ImplementedBySubclass' is invoked by the method).

Although the present invention has been described with respect to the specific preferred embodiment thereof, various changes and modifications may be suggested to one skilled in the art, and it is intended that the present invention encompass such changes and modifications as falls in the scope of the appended claims.

I claim:

1. A method of diagraming collaborations deduced from a design virtual machine execution of a design of at least one method of an object oriented computer program, comprising the steps of:
   performing said design virtual machine execution of a selected method, said performing step comprising the steps of:
      creating a plurality of execution steps for said selected method; and
      as directed by said execution steps, tracing through the design one execution step at a time, said step of tracing comprising the steps of:
         fetching appropriate design information from an annotation of said selected method;
         executing said execution step; and
         checking a result of said executing step for design violations;
   deducing one or more collaborations of said selected method from said performed design virtual machine execution; and
   automatically diagraming said deduced collaborations on a computer display.

2. The method of claim 1, further comprising the step of:
   filtering said deduced collaborations by omitting any of said collaborations that appear in a predefined filter list.

3. The method of claim 1, wherein said step of automatically diagraming comprises:
   automatically diagraming said deduced collaborations on a computer display in a Class/Responsibilities/Collaborators (CRC) report format.

4. The method of claim 1, wherein said step of automatically diagraming comprises:
   automatically diagraming said deduced collaborations on a computer display in an Object Structure Diagram format.

5. The method of claim 1, wherein said step of automatically diagraming comprises:
   automatically diagraming said deduced collaborations on a computer display in an Object Interaction Diagram format.

6. The method of claim 1, wherein said object oriented computer program comprises a set of "JAVA" applets.

7. The method of claim 1, wherein said deducing one or more collaborations step further comprises the step of deducing transient collaborations.

8. A system for diagraming collaborations deduced from a design virtual machine execution of a design of at least one method of an object oriented computer program, comprising:
   means for performing said design virtual machine execution of a selected method, said means for performing comprising:
      means for creating a plurality of execution steps for said selected method; and
      means for tracing through the design one execution step at a time, as directed by said execution steps, said means for tracing comprising:
         means for fetching appropriate design information from an annotation of said selected method;
         means for executing said execution step; and
         means for checking a result of said means for executing for design violations;
   means for deducing one or more collaborations of said selected method from said performed design virtual machine execution; and
   means for automatically diagraming said deduced collaborations on a computer display.

9. The system of claim 8, further comprising:
   means for filtering said deduced collaborations.

10. The system of claim 8, wherein said means for automatically diagraming comprises:
    means for automatically diagraming said deduced collaborations on a computer display in a Class/Responsibilities/Collaborators (CRC) report format.

11. The system of claim 8, wherein said means for automatically diagraming comprises:
    means for automatically diagraming said deduced collaborations on a computer display in an Object Structure Diagram format.

12. The system of claim 8, wherein said means for automatically diagraming comprises:
    means for automatically diagraming said deduced collaborations on a computer display in an Object Interaction Diagram format.

13. The system of claim 8, wherein said object oriented computer program comprises a set of "JAVA" applets.

14. The system of claim 8, wherein said means for deducing one or more collaborations step further comprises means for deducing transient collaborations.

15. A computer program product recorded on computer readable medium for diagraming collaborations deduced from a design virtual machine execution of a design of at least one method of an object oriented computer program, comprising:
    computer readable means for performing said design virtual machine execution of a selected method, said computer readable means for performing comprising:
       computer readable means for creating a plurality of execution steps for said selected method; and
       computer readable means for tracing through the design one execution step at a time, as directed by said execution steps, said computer readable means for tracing comprising:
          computer readable means for fetching appropriate design information from an annotation of said selected method;

computer readable means for executing said execution step, and computer readable means for checking a result of said computer readable means for executing for design violations;

computer readable means for deducing one or more collaborations of said selected method from said performed design virtual machine execution; and computer readable means for automatically diagraming said deduced collaborations on a computer display.

16. The program product of claim 15, further comprising:

computer readable means for filtering said deduced collaborations.

17. The program product of claim 15, wherein said computer readable means for automatically diagraming comprises:

computer readable means for automatically diagraming in a Class/Responsibilities/Collaborators (CRC) report format.

18. The program product of claim 15, wherein said computer readable means for automatically diagraming comprises:

computer readable means for automatically diagraming in an Object Structure Diagram format.

19. The program product of claim 15, wherein said computer readable means for automatically diagraming comprises:

computer readable means for automatically diagraming in an Object Interaction Diagram format.

20. The program product of claim 15, wherein said object oriented computer program comprises a set of "JAVA" applets.

21. The program product of claim 15, wherein said computer readable means for deducing one or more collaborations step further comprises computer readable means for deducing transient collaborations.

* * * * *